US006625656B2

(12) United States Patent
Goldhor et al.

(10) Patent No.: US 6,625,656 B2
(45) Date of Patent: Sep. 23, 2003

(54) METHOD AND APPARATUS FOR CONTINUOUS PLAYBACK OR DISTRIBUTION OF INFORMATION INCLUDING AUDIO-VISUAL STREAMED MULTIMEDIA

(75) Inventors: Richard S. Goldhor, Belmont, MA (US); Donald J. Hejna, Jr., Los Altos, CA (US)

(73) Assignee: Enounce, Incorporated, Palo Alto, CA (US)

( * ) Notice: Subject to any disclaimer, the term of this patent is extended or adjusted under 35 U.S.C. 154(b) by 0 days.

(21) Appl. No.: 09/519,487

(22) Filed: Mar. 6, 2000

(65) Prior Publication Data

US 2002/0052967 A1 May 2, 2002

Related U.S. Application Data

(63) Continuation-in-part of application No. 09/304,761, filed on May 4, 1999.

(51) Int. Cl.[7] .............................................. G06F 15/16

(52) U.S. Cl. ........................ 709/231; 709/232; 709/233

(58) Field of Search ................................ 709/217, 219, 709/218, 231, 232, 233, 234, 235; 348/6, 7, 513, 516, 518; 725/101, 92, 93, 94, 95, 96, 88, 89, 90, 134, 142

(56) References Cited

U.S. PATENT DOCUMENTS 5,544,324 A * 8/1996 Edem et al. ................ 709/231
5,630,013 A * 5/1997 Suzuki et al. ............... 704/216
5,649,050 A * 7/1997 Hardwick et al. .......... 704/203
5,652,627 A * 7/1997 Allen ......................... 348/497
5,692,213 A * 11/1997 Goldberg et al. ........... 345/302
5,694,521 A * 12/1997 Shlomot et al. ............ 704/262
5,749,064 A * 5/1998 Pawate et al. .............. 704/213
5,758,076 A * 5/1998 Wu et al. .................... 709/231
5,767,863 A * 6/1998 Kimura ...................... 345/531
5,793,980 A * 8/1998 Glaser et al. ............... 709/231
5,806,023 A * 9/1998 Satyamurti .................. 704/211
5,808,662 A * 9/1998 Kinney et al. ................ 348/15
5,818,436 A * 10/1998 Imai et al. .................. 345/302
5,822,537 A * 10/1998 Katseff et al. .............. 709/231
5,842,172 A * 11/1998 Wilson ....................... 704/503
5,864,678 A * 1/1999 Riddle ........................ 709/235
5,864,682 A * 1/1999 Porter et al. ................ 709/247
5,893,062 A * 4/1999 Bhadkamkar et al. ...... 704/270
5,953,506 A * 9/1999 Kalra et al. ................. 709/231
5,973,255 A * 10/1999 Tanji ........................... 84/636
6,018,359 A * 1/2000 Kermode et al. ........... 725/101
6,086,537 A * 7/2000 Urbano et al. .............. 600/443
6,123,548 A * 9/2000 Tallal et al. ................ 434/185
6,124,878 A * 9/2000 Adams et al. .............. 725/118
6,169,843 B1 * 1/2001 Lenihan et al. ............... 386/46
6,357,047 B1 * 3/2002 Kurtze et al. ............... 725/151
6,397,251 B1 * 5/2002 Graf ........................... 709/225
6,415,326 B1 * 7/2002 Gupta et al. ................ 709/231
6,449,653 B2 * 9/2002 Klemets et al. ............. 709/231

* cited by examiner

*Primary Examiner*—Mark R. Powell
*Assistant Examiner*—William C. Vaughn, Jr.
(74) *Attorney, Agent, or Firm*—Michael B. Einschlag

(57) ABSTRACT

An embodiment of the present invention is an apparatus for preparing media for playback which comprises: (a) a buffer which stores data corresponding to the media; (b) a time-scale modification system that time-scale modifies data output from the buffer at a playback rate; and (c) a rate determiner that determines the playback rate over an interval to control the amount of data in the buffer.

2 Claims, 16 Drawing Sheets

| | |
|---|---|
| $0 \leq x \leq T_L$ | PLAYBACK RATE = $(SCALE)\tanh^{-1}((X-T_L)/(T_L))$ |
| $T_L < x_L < T_H$ | PLAYBACK RATE = 1.0 |
| $T_H \leq x \leq MAX$ | PLAYBACK RATE = $(SCALE)\tanh^{-1}((X-T_H)/(MAX-T_H))$ |

METHOD AND APPARATUS FOR CONTINUOUS PLAYBACK OR DISTRIBUTION OF INFORMATION INCLUDING AUDIO-VISUAL STREAMED MULTIMEDIA

This is a continuation-in-part of a patent application entitled "Method and Apparatus for Continuous Playback of Streaming Media" which was filed on May 4, 1999, Ser. No. 09/304,761.

TECHNICAL FIELD OF THE INVENTION

The present invention pertains to the field of playback of media such as audio and audio-visual works which are retrieved from sources having non-deterministic delays such as, for example, a server such as a file server or a streaming media server, broadcasting data via the Internet. In particular, the present invention pertains to method and apparatus for providing playback of an audio or audio-visual work received from sources having non-deterministic delays. In further particular, the present invention pertains to method and apparatus for providing continuous playback of media from sources having non-deterministic delays such as, for example, a server such as a file server or a streaming media server, broadcasting data via the Internet, an Intranet, or the like.

BACKGROUND OF THE INVENTION

Many digitally encoded audio and audio-visual works are stored as data on servers such as file servers or streaming media servers that are accessible via the Internet for users to download. FIG. 1 shows, in schematic form, how such audio or audio-visual works are distributed over the Internet. As shown in FIG. 1, media broadcast server 2000 accesses data representing the audio or audio-visual work from storage medium 2100 and broadcasts the data to multiple recipients $\mathbf{2300}_1$ to $\mathbf{2300}_n$ across non-deterministic delay network 2200. In the system shown in FIG. 1, there are two main sources of random delay: (a) delay due to the broadcast server's accessing storage medium 2100 and (b) delay due to the congestion, interference, and other delay mechanisms within network 2200. In more complex systems, delays can also arise from decoders, multicasting CPU time-slices, and other concurrently operating software components.

One well known technique for providing playback of the audio or audio-visual work is referred to as batch playback. Batch playback entails downloading an entire work and initiating playback after the entire work has been received. Another well known technique for providing playback of the audio or audio-visual work is referred to as "streaming." Streaming entails downloading data which represents the audio or audio-visual work and initiating playback before the entire work has been received.

There are several disadvantages inherent in both of these techniques. A prime disadvantage of batch playback is that the viewer/listener must wait for the entire work to be downloaded before any portion of the work may be played. This can be tedious since the viewer/listener may wait a long time for the transmission to occur, only to discover that the work is of little or no interest soon after playback is initiated. The streaming technique alleviates this disadvantage of batch playback by initiating playback before the entire work has been received. However, a disadvantage of streaming is that playback is often interrupted when the flow of data is interrupted due to network traffic, congestion, transmission errors, and the like. These interruptions are tedious and annoying since they occur randomly and have a random duration. In addition, intermittent interruptions often cause the context of the playback stream to be lost as a user waits for playback to be resumed when new data is received.

As one can readily appreciate from the above, a need exists in the art for a method and apparatus for providing substantially continuous playback of media such as audio and audio-visual works received from sources having non-deterministic delays such as a server, for example, a file server or a streaming media server, broadcasting data via the Internet.

SUMMARY OF THE INVENTION

Embodiments of the present invention advantageously satisfy the above-identified need in the art and provide method and apparatus for providing substantially continuous playback of media such as audio and audio-visual works received from sources having non-deterministic delays such as a server, for example, a file server or a streaming media server, broadcasting data via the Internet.

One embodiment of the present invention is an apparatus for preparing media for playback which comprises: (a) a buffer which stores data corresponding to the media; (b) a time-scale modification system that time-scale modifies data output from the buffer at a playback rate; and (c) a rate determiner that determines the playback rate over an interval to control the amount of data in the buffer.

DETAILED DESCRIPTION

Figure 1:
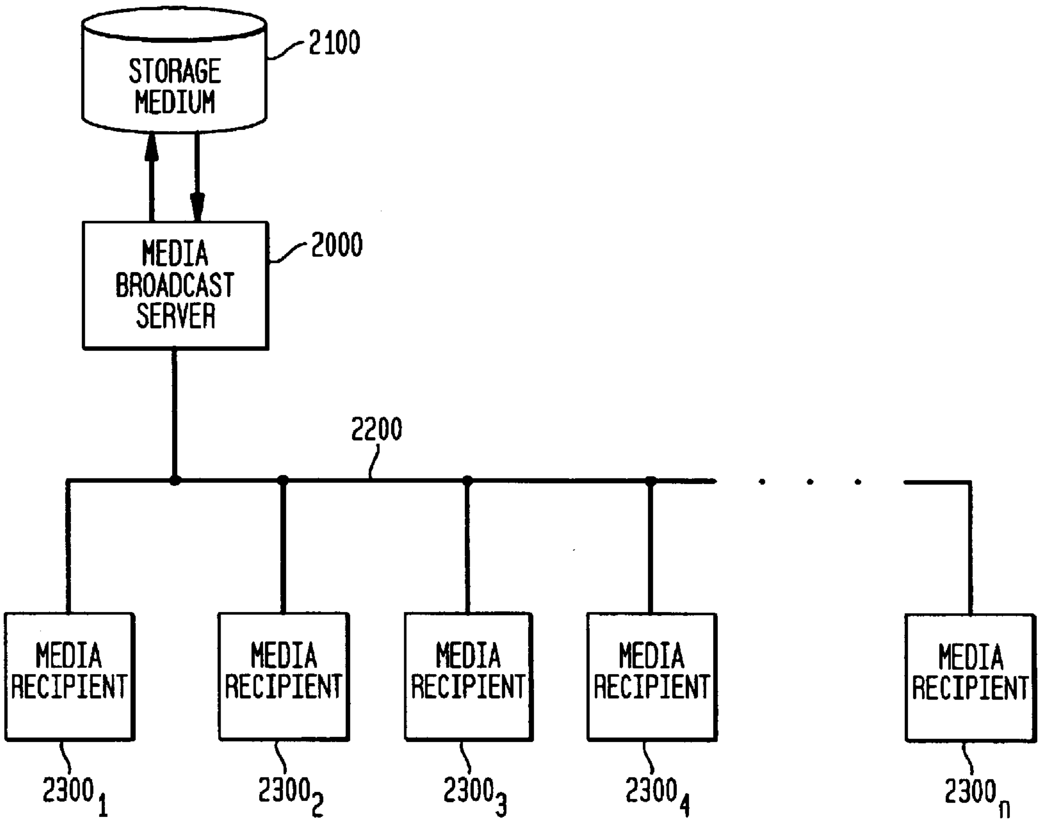
FIG. 1 shows, in schematic form, how audio or audio-visual works are broadcast from a server, for example, a file server or a streaming media server, to recipients over a communication medium, such as, for example, a network such as the Internet.
Figure 2:
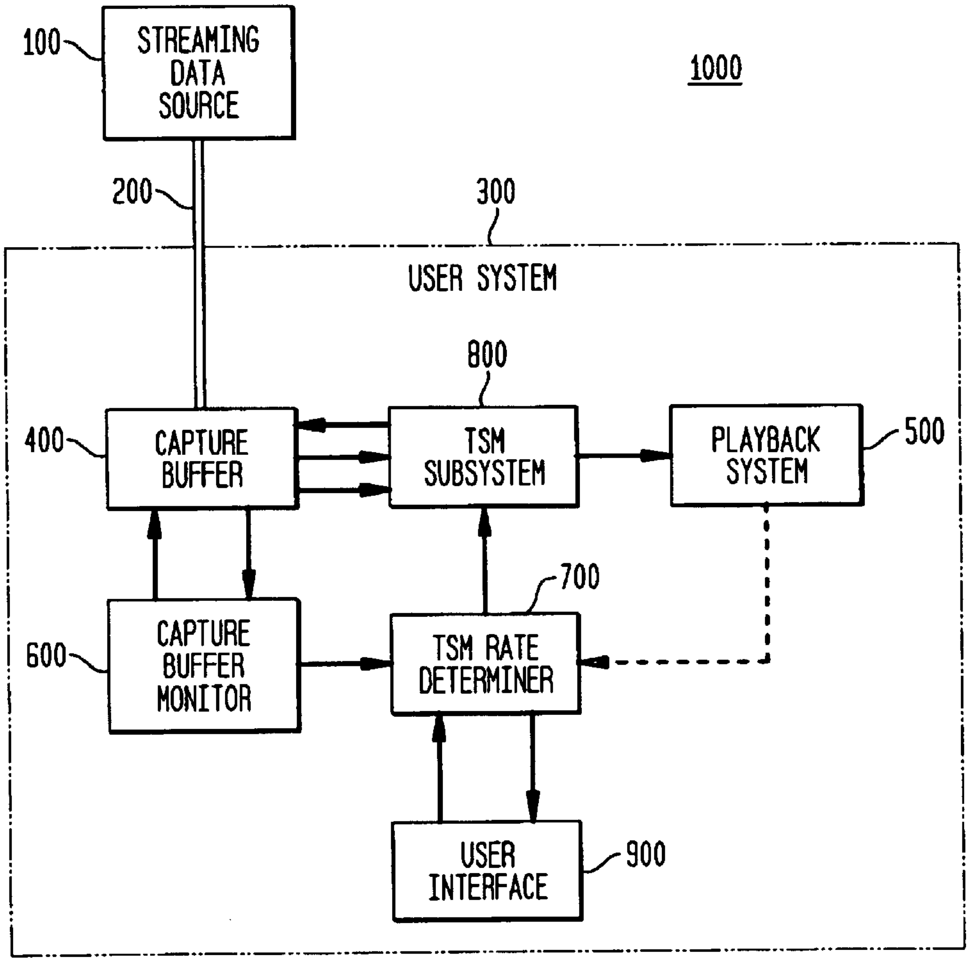
FIG. 2 shows a block diagram of an embodiment of the present invention which provides substantially continuous playback of an audio or audio-visual work received from a source having non-deterministic delays such as a server, for example, a file server or a streaming media server, broadcasting data via a communication medium, such as, for example, a network such as the Internet.

FIG. 2 shows a block diagram of embodiment 1000 of the present invention which provides substantially continuous playback of an audio or audio-visual work received from a source having non-deterministic delays such as a server, for example, a file server or a streaming media server, broadcasting via the Internet. As shown in FIG. 2, Streaming Data Source 100 provides media data representing an audio or audio-visual work through network 200 to User System 300 (US 300), which media data is received at a non-deterministic rate by US 300. Capture Buffer 400 in US 300 receives the media data as input. In a preferred embodiment of the present invention, Capture Buffer 400 is a FIFO (First In First Out) buffer existing, for example, in a general purpose memory store. It should be understood that Capture Buffer 400 may also be implemented using pointers and conventional system memory, circular buffers, and any one of a number of apparatus and methods that are well known to those of ordinary skill in the art.

In the absence of delays in data arrival at US 300 from network 200, the amount of data in Capture Buffer 400 ought to remain substantially constant as the data transfer rate is typically chosen to be substantially equal to the playback rate. However, as is well known to those of ordinary skill in the art, pauses and delays in transmission of the media data through network 200 to Capture Buffer 400 cause data depletion therein since data is simultaneously being output (for example, at a constant rate) from Capture Buffer 400 to satisfy data requirements of Playback System 500. As is well known, if the media data transmitted to US 300 is delayed long enough, a sufficient amount of data in Capture Buffer 400 will be consumed so that Playback System 500 must pause until enough media data has arrived to enable resumption of playback. Thus, a typical playback system must constantly check for arrival of new data while the playback system is paused, and it must initiate playback once new data is received.

In accordance with the present invention, data input to Capture Buffer 400 of US 300 is buffered for a predetermined amount of time which typically varies, for example, from one (1) second to several seconds. Then, Time-Scale Modification (TSM) methods are used to slow the playback rate of the audio or audio-visual work to substantially match a data drain rate required by Playback System 500 with a streaming data rate of the arriving data representing the audio or audio-visual work. As is well known to those of ordinary skill in the art, presently known methods for Time-Scale Modification ("TSM") enable digitally recorded audio to be modified so that a perceived articulation rate of spoken passages, i.e., a speaking rate, can be modified dynamically during playback. During Time-Scale expansion, TSM Subsystem 800 requires less input data to generate a fixed interval of output data. Thus, in accordance with the present invention, if a delay occurs during transmission of the audio or audio-visual work from network 200 to US 300 (of course, it should be clear that such delays may result from any number of causes such as delays in accessing data from a storage device, delays in transmission of the data from a media server, delays in transmission through network 200, delays waiting for CPU resources on software implementations, and so forth), the playback rate is automatically slowed to reduce the amount of data drained from Capture Buffer 400 per unit time. As a result, and in accordance with the present invention, more time is provided for data to arrive at US 300 before the data in Capture Buffer 400 is exhausted. Advantageously, this delays the onset of data depletion in Capture Buffer 400 which would cause Playback System 500 to pause.

As shown in FIG. 2, Capture Buffer 400 receives the following as input: (a) media data input from network 200, (b) requests for information about the amount of data stored therein from Capture Buffer Monitor 600; and (c) media stream data requests from TSM Subsystem 800. In response, Capture Buffer 400 produces the following as output: (a) a stream of data representing portions of an audio or audio-visual work (this is output to TSM Subsystem 800); (b) a stream of location information used to identify the position in the stream of data (this is output to TSM Subsystem 800); and (c) the amount of data stored therein (this is output to Capture Buffer Monitor 600). It should be well known to those of ordinary skill in the art that Capture Buffer 400 may include a digital storage device. There are many methods well known to those of ordinary skill in the art for utilizing digital storage devices, for example a "hard disk drive," to store and retrieve general purpose data. There exist many commercially available apparatus which are well known to those of ordinary skill in the art for use as a digital storage device such as, for example, a CD-ROM, a digital tape, a magnetic disc.

It should be understood that the data in Capture Buffer 400 may be comprised of samples of a signal which are usable by TSM SubSystem 800, or alternatively, the data in Capture Buffer 400 may be comprised of an encoded representation which, when decoded, provides samples of a signal that are usable by TSM SubSystem 800. As one can readily appreciate, a decoder utilized to decode encoded representations of signals can be disposed within Capture Buffer 400, or it can be disposed in any logical location between Capture Buffer 400 and TSM SubSystem 800. There are numerous apparatus and methods that are well-known to those of ordinary skill in the art for implementing such a decoder, which decoder is not shown in the figures for ease of understanding the present invention.

Capture Buffer Monitor 600 receives, as input, information representing (or that can be used to determine) the amount of data in Capture Buffer 400. Capture Buffer Monitor 600 produces, as output: (a) data requests to Capture Buffer 400; and (b) information representing (or that can be used to determine) the amount of data in Capture Buffer 400, which information is output to TSM Rate Determiner 700. Capture Buffer Monitor 600 utilizes any one of a number of methods that are well known to those of ordinary skill in the art to obtain the information representing (or that can be used to determine) the amount of data in Capture Buffer 400. For example, and without limitation, Capture Buffer Monitor 600 may periodically poll Capture Buffer 400 to determine the amount of data in the buffer; Capture Buffer Monitor 600 may monitor the arrival and departure of data from Capture Buffer 400; and Capture Buffer Monitor 600 may compute data arrival and departure rates from Capture Buffer 400.

As further shown in FIG. 2, and in accordance with the present invention, TSM Rate Determiner 700 receives the following as input: (a) a signal (from Capture Buffer Monitor 600) that represents the amount of data present in Capture Buffer 400 and possibly a data arrival rate for Capture Buffer 400; (b) a signal (output, for example, from Playback System 500 or from another module of US 300 such as TSM SubSystem 800) that represents a current data consumption rate of Playback System 500; and (c) a number of parameters (to be described below), which parameters may optionally be supplied by User Interface 900. In some embodiments of the present invention, the signal that represents the current data consumption rate may not be necessary since TSM Rate Determiner 700 can calculate the data consumption rate because it is generating the playback rate used by TSM SubSystem 800. One or more of the following parameters are input to TSM Rate Determiner 700: (a) a low threshold value parameter (TL which is described in detail below) for the amount of data in Capture Buffer 400; (b) a high threshold value parameter (TH which is described in detail below) for the amount of data in Capture Buffer 400; (c) a scale parameter (Scale which is described in detail below) which is used to adjust the playback rate; (d) a parameter designated Interval Size; and (d) a parameter designated Speed_Change_Resolution. These parameters may be input in any one of a number of methods that are well known to those of ordinary skill in the art. For example, they may be set as predetermined parameters for embodiment 1000 in accordance with methods which are well known to those of ordinary skill in the art, i.e., system constants which are loaded when the system is initialized, they can be entered and/or viewed and varied by receiving user input through a user interface, for example User Interface 900, in accordance with methods which are well known to those of ordinary skill in the art, and so forth. However, the manner in which these parameters are set and/or varied are not shown for ease of understanding the present invention.

In response to the input, TSM Rate Determiner 700 produces, as output, a rate signal representing a TSM rate, or playback rate, which can help better balance the data consumption rate of Playback System 500 with an arrival rate of data at Capture Buffer 400.

It should be understood that some embodiments of the present invention can operate in numerous modes. For example, one embodiment of the present invention may operate in a mode that attempts to balance a data consumption rate with a data arrival rate. In this mode, the embodiment utilizes changes in playback rate to alter the data consumption rate, and as a result, the playback rate of material presented by the embodiment is determined by the data delivery rate of information from the source, for example, a media server. For convenience, this mode is referred to as "Rate Determined by Data Arrival" mode. In another mode, an embodiment of the present invention: (a) monitors various system conditions and user input playback presentation rate requests; (b) computes or infers data arrival and departure rates; and (c) intervenes whenever a user request would cause data underflow or overflow in Capture Buffer 400 or a disruption in playback. For convenience, this mode is referred to as "Rate Restricted by Data Arrival" mode.

In some embodiments, the playback rate will be altered in a continuous, for example, slowly varying, fashion. For example, in some embodiments, buffers of time-scale modified output may be queued for playback in Playback System 500. In this case, the queued data may not be modified when a user requests a change in playback rate. As a result, whenever a user requests a change in playback rate, there may be a delay between the time the request is made and the time the change in playback rate is effected. This is because, in these embodiments, although time-scale modification may begin immediately for data sent to Playback System 500 after the request for a change in playback rate was received, there may be a delay until data processed with the previous rate (and buffered for output) has been played back. For this reason, such embodiments may appear to be a bit sluggish. To mitigate this perception, in accordance with one aspect of such embodiments, feedback is provided to the user to indicate a Current Playback Rate (CPR) and a Requested Playback Rate (RPR). CPR and RPR show the user that a newly requested playback rate has been received and that the embodiment is initiating a response. Advantageously, such feedback mitigates a tendency the user might have to "overcorrect" in an effort to elicit a salient response from any embodiment in which it is utilized. In a preferred embodiment of this aspect of the present invention, the playback rate of each buffer of data available to Playback System 500 is associated with the buffer (this can be done by TSM SubSystem 800 or by other components of User System 300). Thus, when such buffers are presented (or are expected to be presented), User Interface 900 is provided an indication of the event of presentation of the buffer to the user (or expected event of presentation of the buffer to the user). In addition, User Interface 900 is presented the playback rate for the associated buffer or information that can be used to obtain the playback rate. For example, Playback System 500 may report the playback rate associated with each buffer as the buffer is played back. Alternatively, Playback System 500 may report the event of presentation of each buffer, and User Interface 900 or TSM Rate Determiner 700 may access a table which contains playback rates for each buffer that was dispatched to Playback System 500. This playback rate information is used to determine CPR and report it to the user, if desired. For example, in one embodiment, CPR is determined to be the playback rate of the most recent buffer played back. In other embodiments, CPR may be computed using any of several mathematical functions, for example, a mathematical average, of multiple values of playback rates of a predetermined number of the buffers played. Furthermore, in accordance with some embodiments that display RPR and CPR, the user receives confirmation of his/her request and is able to observe the embodiment's response. In operation, CPR will follow or chase RPR as the embodiment responds to user playback rate requests. As discussed above, such feedback may be useful to avoid overcorrections by users when the embodiment's response to user requests appears sluggish.

In a preferred embodiment of the present invention, TSM Rate Determiner 700 uses the parameter Interval_Size to segment the input digital data stream in Capture Buffer 400 and to determine a single TSM rate for each segment of the input digital stream. Note the length of each segment is given by the value of the Interval_Size parameter. Further, TSM Rate Determiner 700 uses the parameter Speed_Change_Resolution to determine appropriate TSM rates to pass to TSM SubSystem 800. A desired TSM rate is converted to one of the quantized levels in a manner which is well known to those of ordinary skill in the art. This means that the TSM rate, or playback rate, can change only if the desired TSM rate changes by an amount that exceeds the difference between quantized levels, i.e., Speed_Change_Resolution. As a practical matter then, parameter Speed_Change_Resolution filters small changes in TSM rate, or playback rate.

In another embodiment of TSM Rate Determiner 700, it determines a maximum playback rate that can be used (over a given reporting time interval (rti)) without draining Capture Buffer 400 so much that playback would have to pause to wait for more data to arrive. This maximum playback rate is referred to as the current maximum sustainable playback rate (CmaxSR), and its value represents a scale factor applied to a normal playback rate, i.e., a playback rate with no time-scale modification. In accordance with the present invention, CmaxSR is given as follows:

$$C\max SR_{rti}=\left(\frac{I}{R}\right)+\left(\frac{D}{R*rti}\right)$$

where:

I=arrival rate of incoming data (samples/sec)

R=sampling rate or consumption rate during playback at normal rate.

D=amount of data present in Capture Buffer rti=time interval over which a playback rate is to be sustained For example, if Capture Buffer 400 contains 32,000 data samples of a signal sampled at a rate of 8,000 data samples per second, and one wishes to compute the maximum sustainable playback rate over a 2 second interval when data is arriving at 8,800 samples per second, then we have:

$$C\max SR_{2\,seconds}=\left(\frac{I}{R}\right)+\left(\frac{D}{R*rti}\right)=\left(\frac{8800}{8800}\right)+\left(\frac{32{,}000}{8000*2}\right)=3.1$$

Note that for the same initial conditions and input arrival rate, CmaxSR over a 4-second interval would be:

$$C\max SR_{4\,seconds}=\left(\frac{I}{R}\right)+\left(\frac{D}{R*rti}\right)=\left(\frac{8800}{8800}\right)+\left(\frac{32{,}000}{8000*4}\right)=2.1$$

Note further that for the same initial conditions and input arrival rate, CmaxSR over a 1-second interval would be:

$$C\max SR_{1\,second}=\left(\frac{I}{R}\right)+\left(\frac{D}{R*rti}\right)=\left(\frac{8800}{8800}\right)+\left(\frac{32{,}000}{8000*1}\right)=5.1$$

This means that the maximum sustainable playback rate over one, two, and four second intervals are 5.1, 3.1, and 2.1 respectively. As a result, one can readily appreciate that CmaxSR is a function of: (a) the arrival rate of incoming data; (b) the sampling rate or consumption rate during playback at normal rate; (c) the amount of data in the Capture Buffer; and (d) the time interval over which a playback rate is to be sustained. It should be understood that for ease of understanding this aspect of the present invention, the description above used samples per second to represent I and R. However, the present invention is not limited to such a representation, for example, embodiments of the present invention include the use of any representation of data per unit time, for example, data packets containing a compressed representation of a specific duration of audio or audio/video signals.

In a manner similar that described above with respect to a maximum sustainable playback rate, some embodiments of the present invention determine a minimum sustainable playback rate that can be used (over a given reporting time interval (rti)) without causing Capture Buffer 400 to overflow with arriving data. CminSR is given as follows:

$$C\min SR_{rti}=\left(\frac{I}{R}\right)-\left(\frac{C}{R*rti}\right)$$

where:

I=arrival rate of incoming data (samples/sec)

R=sampling rate or consumption rate during playback at normal rate.

C=capacity present in Capture Buffer (amount of free space)

rti=time interval over which a playback rate must be sustained

Thus if Capture Buffer 400 is capable of holding a 64,000 samples of data, and there are 16,000 samples currently in Capture Buffer 400, the normal data consumption rate is 8,000 samples per second, and the reporting time interval is 2 seconds, then:

$$\begin{aligned}C\min SR_{2\,seconds}&=\left(\frac{I}{R}\right)-\left(\frac{C}{R*cti}\right)\\&=\left(\frac{7200}{8000}\right)-\left(\frac{(64{,}000-16{,}000)}{8000*2}\right)\\&=-2.1\end{aligned}$$

It should be noted that CminSR values below zero indicate that playback can be stopped for a duration of rti without overflowing the Capture Buffer. Note that for the same initial conditions and input arrival rate, CminSR over a 10-second interval would be:

$$\begin{aligned}C\min SR_{2\,seconds}&=\left(\frac{I}{R}\right)-\left(\frac{C}{R*cti}\right)\\&=\left(\frac{7200}{8000}\right)-\left(\frac{(64{,}000-16{,}000)}{8000*10}\right)\\&=0.3\end{aligned}$$

It should be noted that CminSR indicates the minimum playback speed that can be maintained without causing Capture Buffer 400 to overflow, or sending a message to the data server, requesting that the data server cease sending data.

As shown above, CmaxSR and CminSR are functions of the data arrival rate. Further, the data arrival rate may vary over time due to factors such as, without limitation, network latency, transmission errors, and congestion. Thus, CmaxSR (t) and CminSR(t) will vary over time for a given value of t as network delays, data delivery rates, data consumption rates, and consequently the amount of data in the Capture Buffer, change.

It should be noted that I, the input arrival rate may be estimated in any number of ways including, without limitation, comparing time-stamps between arriving data, monitoring of arrival times and data packet sizes, and other methods described below.

As still further shown in FIG. 2, TSM SubSystem 800 receives as input: (a) a stream of data representing portions of the audio or audio-visual work (output from Capture Buffer 400); (b) a stream of location information (output from Capture Buffer 400) used to identify the position in the stream of data being sent, for example, a sample count or time value; and (c) the rate signal specifying the desired TSM rate, or playback rate (output from TSM Rate Determiner 700).

Figure 5:
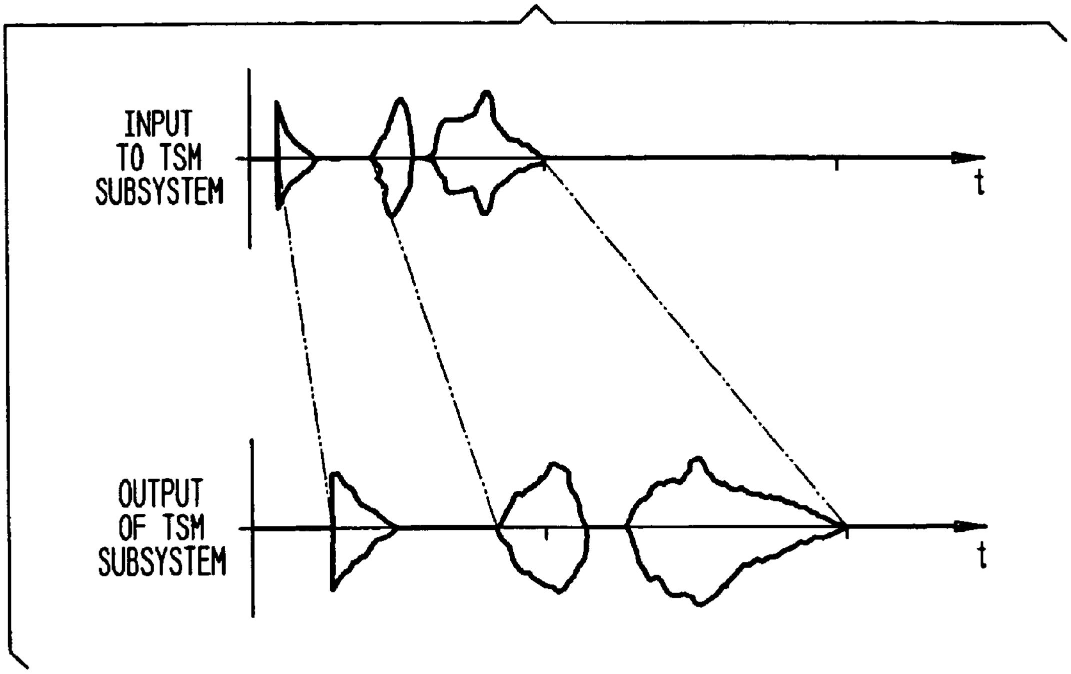
FIG. 5. shows, in graphical form, relative amounts of data at an input and an output of TSM Subsystem 800 in the embodiment of the present invention shown in FIG. 2 during time-scale expansion, i.e., slow down of the playback-rate of the streaming media.
Figure 6:
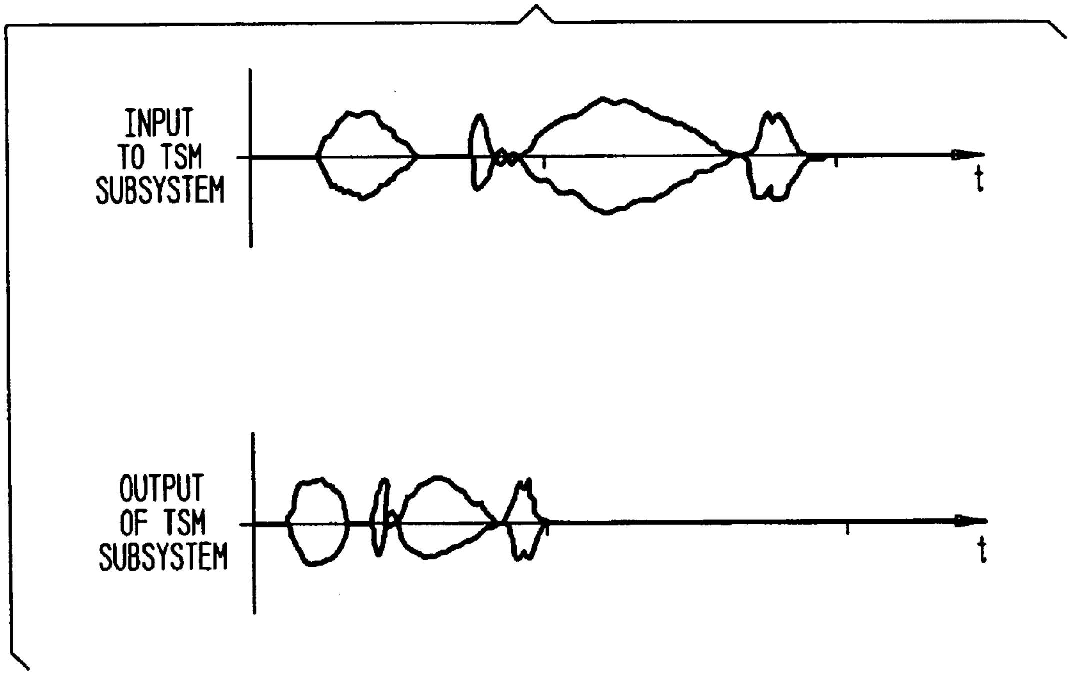
FIG. 6. shows, in graphical form, relative amounts of data at an input and an output of TSM Subsystem 800 in the embodiment of the present invention shown in FIG. 2 during time-scale compression, i.e., speed up of the playback rate of the streaming media.

In accordance with the present invention, TSM SubSystem 800 modifies the input stream of data in accordance with well known TSM methods to produce, as output, a stream of samples that represents a Time-Scale Modified signal. The Time-Scale modified output signal contains more samples per block of input data if Time-Scale Expansion is applied, as shown in FIG. 5. Similarly, if Time-Scale Compression is applied, the output from TSM SubSystem 800 contains fewer samples per block of input data, as shown in FIG. 6. Thus, TSM SubSystem 800 can create more samples than it is given by creating an output stream with a slower playback rate (Time-Scale Expanded).

Similarly, TSM SubSystem 800 can create fewer samples than it is given by creating an output stream with a faster playback rate (Time-Scale Compressed). In a preferred embodiment of the present invention, the TSM method used is a method disclosed in U.S. Pat. No. 5,175,769 (the '769 patent), which '769 patent is incorporated by reference herein, one of the inventors of the present invention also being a joint inventor of the '769 patent. Thus, the output from TSM SubSystem 800 is a stream of samples representing portions of the audio or audio-visual work, which output is applied as input to Playback System 500. Playback System 500 plays back the data output from TSM SubSystem 800. There are many methods of implementing Playback System 500 that are well known to those of ordinary skill in the art, for example, as a playback engine.

In accordance with the present invention, the stream of digital samples output from TSM SubSystem 800 has a playback rate, supplied from TSM Rate Determiner 700, that provides a balance of the data consumption rate of TSM SubSystem 800 with the arrival rate of data input to US 300. Note that, in accordance with this embodiment of the present invention, the data consumption rate of Playback System 500 is fixed to be identical to the data output rate of TSM SubSystem 800. Thus, when a playback rate representing Time-Scale Expansion is output from TSM Rate Determiner 700 and applied as input to TSM SubSystem 800, the number of data samples required per unit time by TSM SubSystem 800 is reduced in proportion to the amount of Time-Scale Expansion. A reduction in the number of data signals sent to TSM SubSystem 800 slows the data drain-rate from Capture Buffer 400 and, as a result, less data from Capture Buffer 400 is consumed per unit time. This, in turn, increases the amount of playback time before a pause is required due to emptying of Capture Buffer 400.

As one of ordinary skill in the art should readily appreciate, although the present invention has been described in terms of slowing down playback, the present invention is not thusly limited and includes embodiments where the playback rate is increased in situations where data arrives in Capture Buffer 400 at a rate which is faster than the rate at which it would be consumed during playback at a normal rate. In this situation the playback rate is increased and the data is consumed by TSM SubSystem 800 at a faster rate to avoid having Capture Buffer 400 overflow.

As one of ordinary skill in the art can readily appreciate, whenever embodiment 1000 provides playback rate adjustments for an audio-visual work, TSM SubSystem 800 speeds up or slows down visual information to match the audio in the audio-visual work. To do this in a preferred embodiment, the video signal is "Frame-subsampled", "Frame-replicated", or displayed with an altered frame-rate in accordance with any one of the many methods known to those of ordinary skill in the prior art to maintain synchronism between the audio and visual portions of the audio-visual work. Thus, if one speeds up the audio and samples are requested at a faster rate, the frame stream is subsampled, i.e. frames are skipped, discarded or merged to maintain a fixed number of frames displayed per unit time, or the frame-rate may be increased, i.e. frames may be rendered to a visual display more frequently. In a similar manner, if one slows down the audio and samples are utilized at a slower rate, the frame stream may be replicated or interpolated to maintain a fixed frame-rate, or the frame-rate may be decreased, i.e. frames may be rendered to a visual display less frequently.

As shown in FIG. 2, embodiment 1000 optionally comprises User Interface 900 for operating in "Rate Restricted by Data Arrival" mode in which User Interface 900 receives user generated rate requests in accordance with any one of a number of methods which are well known to those of ordinary skill in the art. The user generated rate requests are applied as input to TSM Rate Determiner 700. These user generated rate requests may be "folded" into the playback rates determined by TSM Rate Determiner 700 to provide continuous playback of streaming media. This means that these requests may be ignored or modified when they would interfere with the objective of providing continuous playback. The term "folded" means that requests from User Interface 900 may be overridden to prevent overflow or underflow of Capture Buffer 400.

In accordance with an embodiment of this mode, if a requested playback rate (RPR) received from User Interface 900 exceeds CmaxSR, the request may be acknowledged by updating a position of RPR displayed in User Interface 900 (to be described in detail below), but the rate output by TSM Rate Determiner 700 to TSM SubSystem 800: (a) may be limited to CmaxSR; or (b) may be determined by using any one of a number of algorithms that give precedence to rates which prevent underflow and overflow of Capture Buffer 400. For example, CmaxSR and equations (2), (3), and (4) set forth below may be used as follows. Whenever a user inputs a new RPR: (a) the new RPR value is compared with CmaxSR; and (b) a playback rate is determined using equations 2, 3, and 4 below. If RPR exceeds the lesser of CmaxSR and the playback rate from these equations, the lesser value is used. Similarly: (a) the new RPR value is compared with CminSR; and (b) a playback rate is determined using equations 2, 3, and 4 below. If RPR is below the higher of CmaxSR and the playback rate from these equations, the higher value is used. Thus, in accordance with this embodiment, the rate output to TSM SubSystem 800 will stay within a range of values designed to prevent overflow and underflow of Capture Buffer 400.

Although FIG. 2 shows Capture Buffer 400, Playback System 500, Capture Buffer Monitor 600, TSM Rate Determiner 700, TSM SubSystem 800, and User Interface 900 of embodiment 1000 as being embodied as separate modules, it will be understood by those of ordinary skill in the art that the functions they perform can be performed by one or more modules in which some or all of the functions are combined. In a preferred embodiment, some or all of the modules are embodied as software programs or modules which run on a general purpose computer such as, for example, a personal computer. Further, in light of the detailed discussion above, it should be well known to one of ordinary skill in the art, to implement these programs or modules in software.

As should be clear to those of ordinary skill in the art, embodiments of the present invention include the use of any one of a number of algorithms for determining the playback rate to help balance the rate of data consumption for playing back the audio or audio-visual works with the rate of data input from network 200 having non-deterministic delays. In one embodiment of the present invention, the playback rate is determined to vary with the fraction of Capture Buffer 400 that is filled with data. For example, for each 10% decrement of data depletion, the playback rate is reduced by 10% except when the input data contains an "end" signal. It should be clear to those of ordinary skill in the art how to modify this algorithm to achieve any of a number of desired balance conditions. For example, in situations where the duration of a delay can vary drastically, a non-linear relationship may be used to determine the playback rate. One non-linear function that may be used is the inverse tangent function. In this case $$\text{Playback Control Parameter}=(2*\#\text{samples\_in\_buffer}/\text{elements\_in\_buffer}))-1$$

$$\text{Playback Rate}=\tanh^{-1}(\text{Playback Control Parameter}) \quad (1)$$

where: (a) #samples_in_buffer is the number of samples of data in Capture Buffer 400; (b) elements_in_buffer is the total number of samples of data that can be stored in Capture Buffer 400; and (c) Playback Control Parameter is a parameter that is always greater than or equal to −1 and less than or equal to +1.

Figure 3:
FIG. 3 shows, in pictorial form, low and high thresholds used in one embodiment of Capture Buffer 400 in the embodiment of the present invention shown in FIG. 2.

In a preferred embodiment of the present invention, a low threshold ($T_L$) value and a high threshold ($T_H$) value are be used to construct a piece-wise graph of playback rate versus amount of data in Capture Buffer 400. FIG. 3 shows, in pictorial form, how $T_L$ and $T_H$ relate to the amount of data in Capture Buffer 400. These thresholds are used in accordance with to the following set of equations:

$$\text{For } 0<=X<=T_L \text{ Playback Rate}=\text{Scale } \tanh^{-1}((X-T_L)/T_L) \quad (2)$$

$$\text{For } T_L<X<T_H \text{ Playback Rate}=1.0(\text{the default playback rate}) \quad (3)$$

$$\text{For } T_H<=X<=\text{Max Playback Rate}=\text{Scale } \tanh^{-1}((X-T_H)/(\text{Max}-T_H)) \quad (4)$$

where Scale is arbitrary scale factor.

Figure 4:
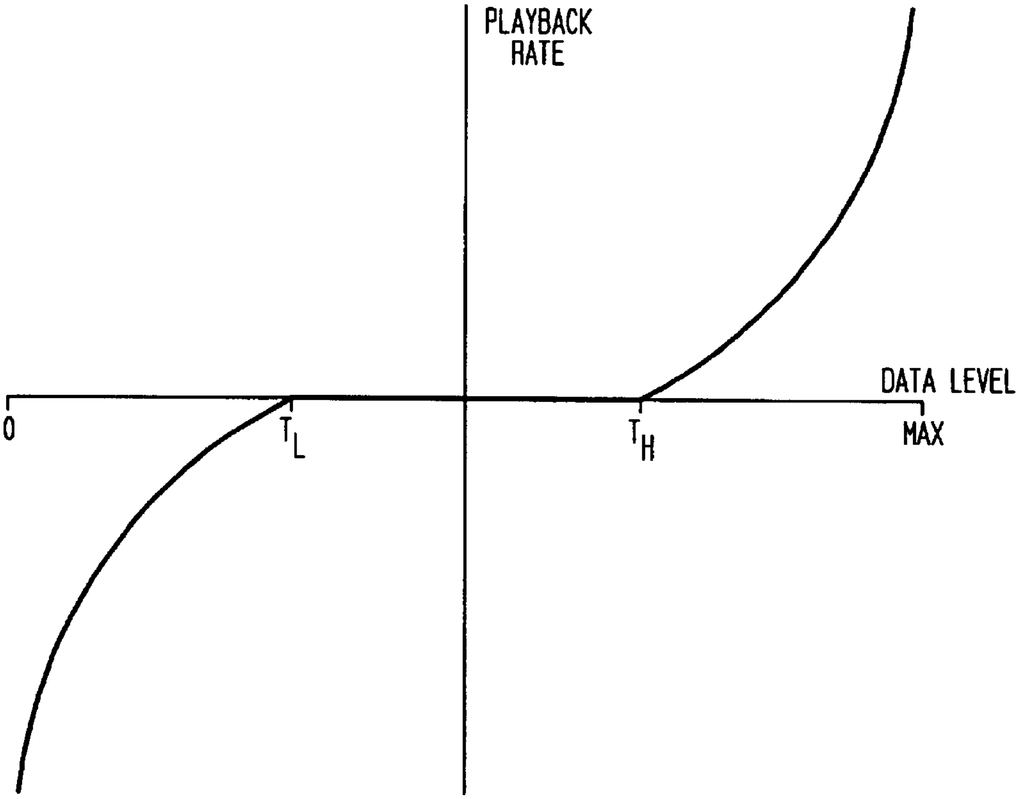
FIG. 4. shows a graph of playback rate versus the amount of data in Capture Buffer 400 in the embodiment of the present invention shown in FIG. 2.

FIG 4. shows a graph of playback rate versus amount of data in Capture Buffer 400 using eqns. (2)–(4). From FIG. 4, one can readily appreciate that for small deviations from an ideal amount of data in Capture Buffer 400 (origin 0 in FIG. 4), changes in the playback rate are linear; however, larger deviations generate a more pronounced non-linear response. Further, changes in the amount of data in Capture Buffer 400 which remain between low threshold level $T_L$ and high threshold level $T_H$ do not cause any change in playback rate.

Figure 7:
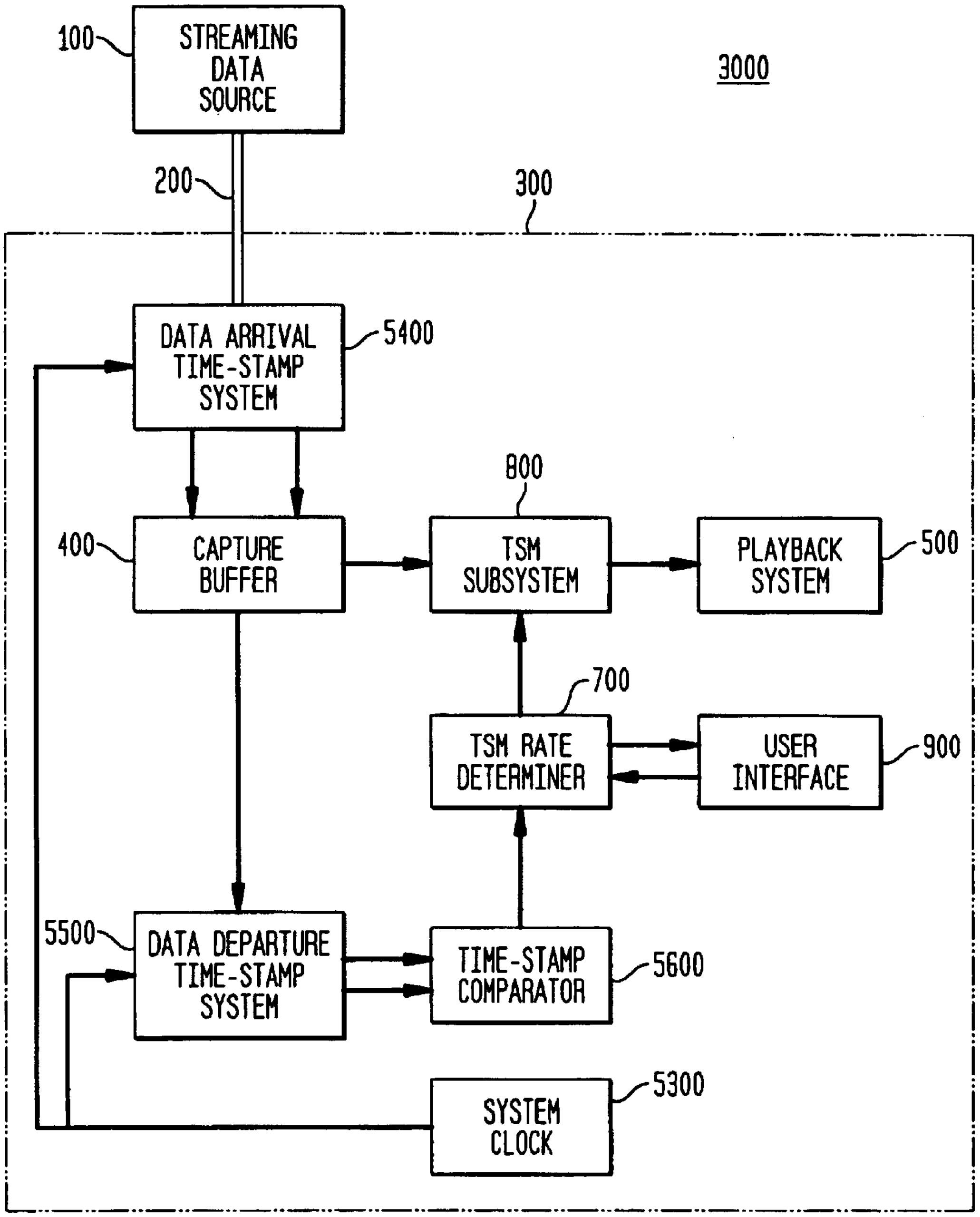
FIGS. 7–13 show block diagrams of alternative embodiments of the present invention.

FIG. 7 shows a block diagram of embodiment 3000 of the present invention. As shown in FIG. 7, embodiment 3000 is obtained from embodiment 1000 shown in FIG. 2 by deleting Capture Buffer Monitor 600 and adding: (a) Data Arrival Time-Stamp System (DATSS) 5400; (b) Data Departure Time-Stamp Apparatus 5500 (DDTSS); (c) Time-Stamp Comparator (TSC) 5600; and (d) System Clock 5300.

As shown in FIG. 7, DATSS 5400 receives, as input: (a) media data (from network 200) and (b) information representing a clock time value (from System Clock 5300). DATSS 5400 produces, as output: (a) information representing a particular portion of media data received from network 200 (this is applied as input to Capture Buffer 400) and (b) the clock time value of System Clock 5300 at the arrival time of the particular portion of the media data (this is applied as input to Capture Buffer 400). DATSS 5400 uses any one of many methods that are well known to those of ordinary skill in the art for appending or associating the arrival time obtained from System Clock 5300 to or with, respectively, each portion of the media data arriving from network 200.

As further shown in FIG. 7, Capture Buffer 400 receives, as input, the information representing a particular portion of media data and its appended or associated time value of arrival. Capture Buffer 400 produces, as output: (a) media data (this is output to TSM SubSystem 800) and (b) information identifying the particular portion of media data and its associated clock value, including without limitation the media data itself and its associated clock time (this is output to DDTSS 5500).

As still further shown in FIG. 7, DDTSS 5500 receives, as input: (a) media data with the arrival time appended thereto or associated therewith by DATSS 5400 (from Capture Buffer 400) and (b) information representing a clock time value (from System Clock 5300). DDTSS 5500 produces, as output: (a) information representing the arrival time of the particular portion of the media data appended thereto, or associated therewith, by DATSS 5400 (applied as input to TSC 5600) and (b) the clock time of System Clock 5300 at the departure time of the particular portion of media data from Capture Buffer 400, i.e., the time it arrived at DDTSS 5500 (applied as input to TSC 5600). DDTSS 5500 uses any one of many methods that are well known to those of ordinary skill in the art for extracting or associating the arrival time from or with each portion of media data transferred from Capture Buffer 400.

As yet still further shown in FIG. 7, TSC 5600 receives, as input: (a) the arrival time, i.e., date stamp, of a portion of media data (from DDTSS 5500) and (b) the departure time of the portion of media data (from DDTSS 5500). TSC 5600 produces, as output, a Playback Control Parameter value corresponding to an amount of time between the arrival and departure times of the portion of media data (applied as input to TSM Rate Determiner 700). TSC 5600 computes the Playback Control Parameter by subtracting the arrival time from the departure time value, and normalizing the result as follows:

$$\text{Delay Time}=\text{Departure Time}-\text{Arrival Time} \quad (5)$$

$$\text{Playback Control Parameter}=\text{Normalize }((\text{Delay Time}-T_S)/A) \quad (6)$$

where $T_S$ and A are constants that are chosen to optimize system performance and are input in the same manner discussed above with respect to other system parameters.

In accordance with the present invention, Normalize (Delay Time) is any function that converts Delay Time values to normalized values that are greater than or equal to −1 (i.e., a maximum data underflow) and less than or equal to +1 (a maximum data overflow). The normalized value of 0 indicates a balance in the arrival and departure rates for data. For example, the following function could be used to determine a normalized Delay Time:

$$\text{Normalize (Delay Time)}=-1+(2*\min(\text{Delay Time}/\text{Unit Delay}, \text{Max. Units})/\text{Max. Units}) \quad (7)$$

The normalized values are used to indicate an amount of time-scale modification that is required, or desired, to avoid data overflow or data underflow situations. It should be clear that other Normalize (Delay Time) functions can be employed using criteria that should be well known to those of ordinary skill in the art.

The output of TSC 5600 is then applied as input to TSM Rate Determiner 700.

The remainder of embodiment 3000 operates in the manner described for the corresponding portions of embodiment 1000 shown in FIG. 2. In particular, in accordance with the present invention, TSM Rate Determiner 700 may utilize the Playback Control Parameter and eqn. (1) to determine a Playback Rate, or any of a number of methods for combining inputs rates to determine an output rate (for example, any of the techniques described above).

As shown in FIG. 7, embodiment 3000 optionally comprises User Interface 900 for receiving user generated rate requests in accordance with any one of a number of methods which are well known to those of ordinary skill in the art. The user generated rate requests are applied as input to TSM Rate Determiner 700. These user generated rate requests may be "folded" into the playback rates determined by TSM Rate Determiner 700 to provide continuous playback of streaming media. This means that these requests may be ignored or modified when they would interfere with the objective of providing continuous playback.

Although FIG. 7 shows Capture Buffer 400, Playback System 500, TSM Rate Determiner 700, TSM SubSystem 800, User Interface 900, System Clock 5300, DATSS 5400, DDTSS 5500, and TSC 5600 of embodiment 3000 as being embodied as separate modules, it will be understood by those of ordinary skill in the art that the functions they perform can be performed by one or more modules in which some or all of the functions are combined. In a preferred embodiment, some or all of the modules are embodied as software programs or modules which run on a general purpose computer such as, for example, a personal computer. Further, in light of the detailed discussion above, it should be well known to one of ordinary skill in the art, to implement these programs or modules in software.

Figure 8:
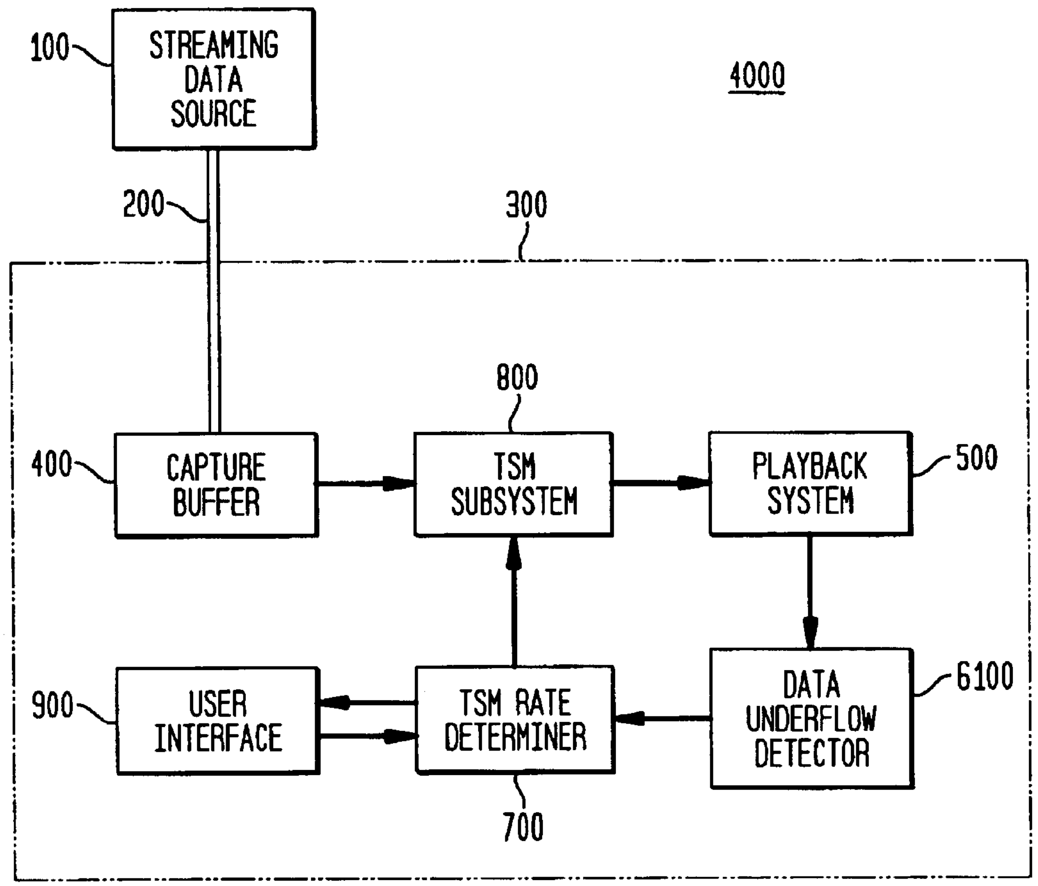

FIG. 8 shows a block diagram of embodiment 4000 of the present invention. As shown in FIG. 8, embodiment 4000 is obtained from embodiment 1000 shown in FIG. 2 by deleting Capture Buffer Monitor 600 and adding Data Underflow Detector (DUD) 6100 and System Clock 5300.

As shown in FIG. 8, DUD 6100 receives, as input, control signals from Playback System 500. In response, DUD 6100 processes the control signals in a manner to be described in detail below and outputs Playback Control Parameter values that are applied as input to TSM Rate Determiner 700.

In accordance with the present invention, and using methods that are well known to those of ordinary skill in the art, DUD 6100 monitors control signals output from Playback System 500 to indicate "data underflow conditions." It is well known to those of ordinary skill in the art that a typical embodiment of Playback System 500 outputs control signals to indicate data underflow conditions. For example, typical data underflow conditions exist whenever: (a) Playback System 500 is attempting to playback media data, and has no data available to output; or (b) Playback System 500 is attempting to playback media data, and has less than a predetermined minimum amount of data available to output. As is well known to those of ordinary skill in the art, particular embodiments of Playback System 500 may indicate a data underflow condition in different ways, including but not limited to, by: (a) setting a flag in the control signals it sends to DUD 6100 and (b) quantifying the amount of data available to it (for example, in bytes) and reporting that quantity. DUD 6100 can compare the reported quantity with a predetermined minimum quantity to detect a data underflow condition. Other techniques for detecting a data underflow condition may be based on: (a) monitoring the amount of data Playback System 500 requests from TSM SubSystem 800; (b) the frequency with which Playback System 500 requests additional data (in this case, TSM SubSystem 800 could send a signal to DUD 6100 for analysis); or (c) other aspects of the behavior of Playback System 500.

In general, in accordance with the present invention, DUD 6100 collects and calculates information about the existence of a data underflow condition, timing information specifying when the data underflow condition occurred, the number of data underflow events detected, and the duration of the data underflow conditions. In accordance with the present invention, DUD 6100 uses this information to calculate a Playback Control Parameter, which it applies as input to TSM Rate Determiner 700. In embodiments using timing information, embodiment 4000 would include a system clock 5300 which would be interrogated by DUD 6100.

For example, DUD 6100 may calculate the Playback Control Parameter based on the length of time since a data underflow condition was detected:

$$\text{Elapsed Time} = \text{Current Time} - \text{Most Recent Underflow Time} \tag{8}$$

where the relevant times are generated by interrogating System Clock 5300.

$$\text{Normalize (Elapsed Time)} = -1 + (2 * \min(\text{Elapsed Time/Unit Elapsed, Max. Units})/\text{Max.}) \tag{9}$$

It should be clear that other Normalize (Elapsed Time) functions can be employed using criteria that should be well known to those of ordinary skill in the art. In fact, alternative embodiments of DUD 6100 use other statistical measures associated with the data underflow condition. Examples of such other statistical measures and their utility are well known to those of ordinary skill in the art. For example, values could be sampled over a time interval and averaged. In an alternative embodiment, the underflow condition indicated by Playback System 500 is sampled at fixed intervals, and the number of underflow indications in the last N sample, for example, 5 samples, are then set to Normalize (Underflow Count)=Underflow count−2.

The remainder of embodiment 4000 operates in the manner described for the corresponding portions of embodiment 1000 shown in FIG. 2.

As shown in FIG. 8, embodiment 4000 optionally comprises User Interface 900 for receiving user generated rate requests in accordance with any one of a number of methods which are well known to those of ordinary skill in the art. The user generated rate requests are applied as input to TSM Rate Determiner 700. These user generated rate requests may be "folded" into the playback rates determined by TSM Rate Determiner 700 to provide continuous playback of streaming media. This means that these requests may be ignored or modified when they would interfere with the objective of providing continuous playback.

Although FIG. 8 shows Capture Buffer 400, Playback System 500, Capture TSM Rate Determiner 700, TSM SubSystem 800, User Interface 900, and DUD 6100 of embodiment 4000 as being embodied as separate modules, it will be understood by those of ordinary skill in the art that the functions they perform can be performed by one or more modules in which some or all of the functions are combined. In a preferred embodiment, some or all of the modules are embodied as software programs or modules which run on a general purpose computer such as, for example, a personal computer. Further, in light of the detailed discussion above, it should be well known to one of ordinary skill in the art, to implement these programs or modules in software.

Figure 9:
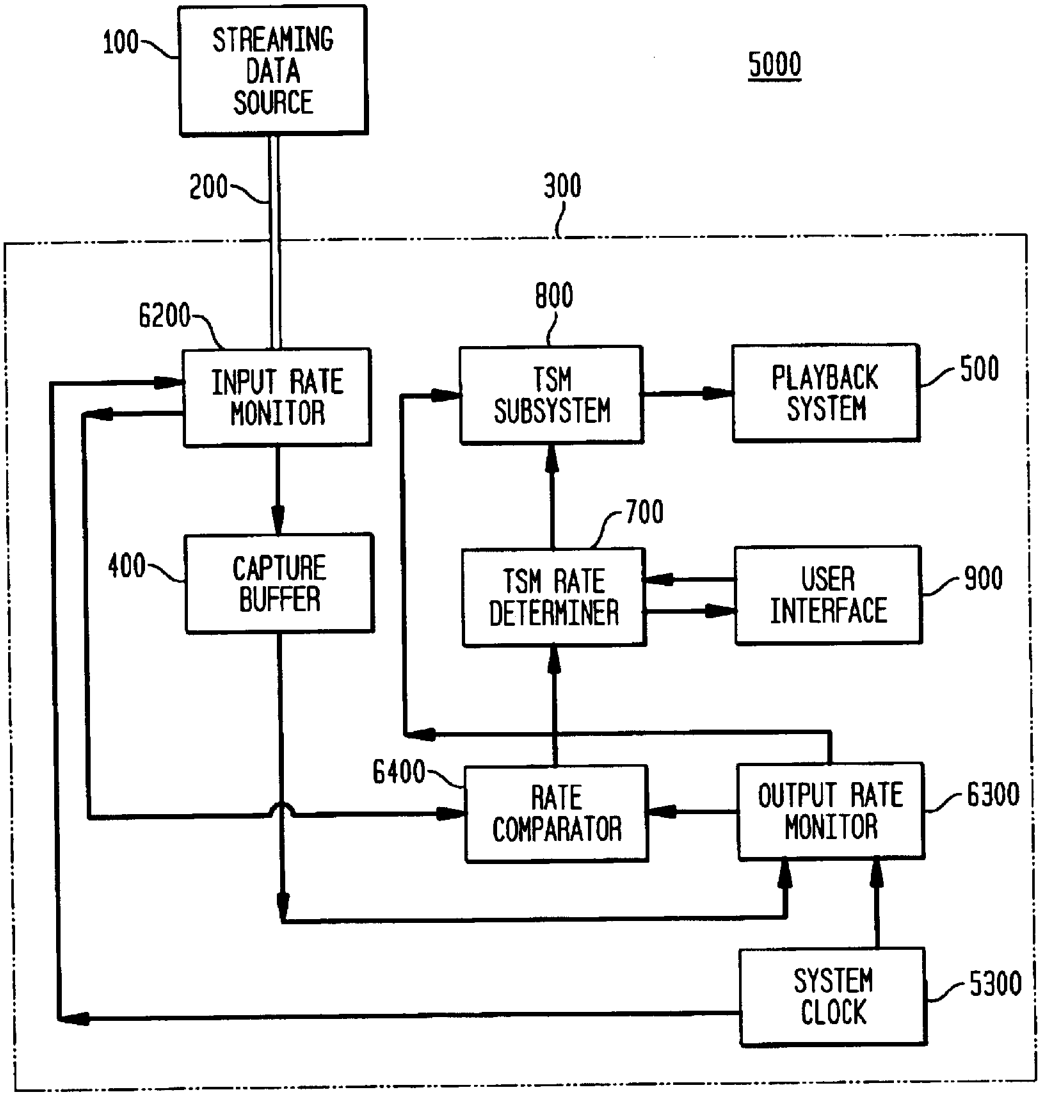

FIG. 9 shows a block diagram of embodiment 5000 of the present invention. As shown in FIG. 9, embodiment 5000 is obtained from embodiment 1000 shown in FIG. 2 by deleting Capture Buffer Monitor 600 and adding: (a) Input Rate Monitor (IRM) 6200; (b) Output Rate Monitor (ORM) 6300; (c) Rate Comparator (RC) 6400; and (d) System Clock 5300.

As shown in FIG. 9, IRM 6200 receives, as input: (a) media data (from network 200) and (b) information representing a clock time value (from System Clock 5300). IRM 6200 produces, as output: (a) media data (this is applied as input to Capture Buffer 400); (b) information representing a short-term arrival rate at which media data is being received from network 200 (this is applied as input to Rate Comparator 6400); and (c) the clock time value of System Clock 5300 associated with the short-time arrival rate (this is applied as input to RC 6400). IRM 6200 uses any one of many methods that are well known to those of ordinary skill in the art to calculate the data arrival rate over small time-intervals ("short-term arrival rate"). For example, one method for calculating the short-term arrival rate includes counting the number or amount of arriving media data, for example, in the previous 700 microseconds, or previous 3 seconds.

As further shown in FIG. 9, ORM 6300 receives, as input: (a) media data emptied from Capture Buffer 400; and (b) information representing a clock time value (from System Clock 5300). ORM 6300 produces, as output: (a) media data emptied from Capture Buffer 400 (this is applied as input to TSM SubSystem 800); and (b) information representing a short-term emptying rate at of media data as it is being delivered to ORM 6300 (this is applied as input to RC 6400). ORM 6300 uses any one of many methods that are well known to those of ordinary skill in the art to calculate the short-term emptying rate. For example, ORM 6300 may monitor the number of data units, buffers, frames, or digital samples, and the like fetched from Capture Buffer 400 over a small time-interval to determine a short-term emptying rate.

As still further shown in FIG. 9, RC 6400 receives, as input: (a) the short-time arrival rate (from IRM 6200) and (b) the short-term emptying rate (from ORM 6300). In response, RC 6400 calculates two values representing an absolute and a fractional difference between these two short-time rates. RC 6400 computes the absolute difference by subtracting the short-time arrival rate from the short-time emptying rate, and computes the fractional difference by dividing the absolute difference by the short-time emptying rate. Alternative embodiments of RC 6400 may employ other statistical comparisons of the short-time arrival and emptying rates. Examples of such other statistical measures and their utility are well known to those of ordinary skill in the art. For example, without limitation, an average of the five (5) most recent short-term values, or the arithmetic mean of the high and low values over a specific interval.

In accordance with this embodiment of the present invention, RC 6400 calculates the Playback Control Parameter values from the fractional difference in rate using the following formula:

$$\text{Drift Rate}=\text{short-time emptying rate}/\text{short-time arrival rate} \quad (10)$$

$$\text{Normalize(Drift Rate)}=-1+(2*\min(\text{Drift Rate}/\text{Unit Drift, Max. Units})/\text{Max. Units}) \quad (11)$$

Finally, RC 6400 applies the Playback Control Parameter values as input to TSM Rate Determiner 700.

The remainder of embodiment 5000 operates in the manner described for the corresponding portions of embodiment 1000 shown in FIG. 2.

As shown in FIG. 9, embodiment 5000 optionally comprises User Interface 900 for receiving user generated rate requests in accordance with any one of a number of methods which are well known to those of ordinary skill in the art. The user generated rate requests are applied as input to TSM Rate Determiner 700. These user generated rate requests may be "folded" into the playback rates determined by TSM Rate Determiner 700 to provide continuous playback of streaming media. This means that these requests may be ignored or modified when they would interfere with the objective of providing continuous playback.

Although FIG. 9 shows Capture Buffer 400, Playback System 500, TSM Rate Determiner 700, TSM SubSystem 800, User Interface 900, System Clock 5300, Input Rate Monitor 6200, Output Rate Monitor 6300, and Rate Comparator 6400 of embodiment 5000 as being embodied as separate modules, it will be understood by those of ordinary skill in the art that the functions they perform can be performed by one or more modules in which some or all of the functions are combined. In a preferred embodiment, some or all of the modules are embodied as software programs or modules which run on a general purpose computer such as, for example, a personal computer. Further, in light of the detailed discussion above, it should be well known to one of ordinary skill in the art, to implement these programs or modules in software.

Figure 9A:
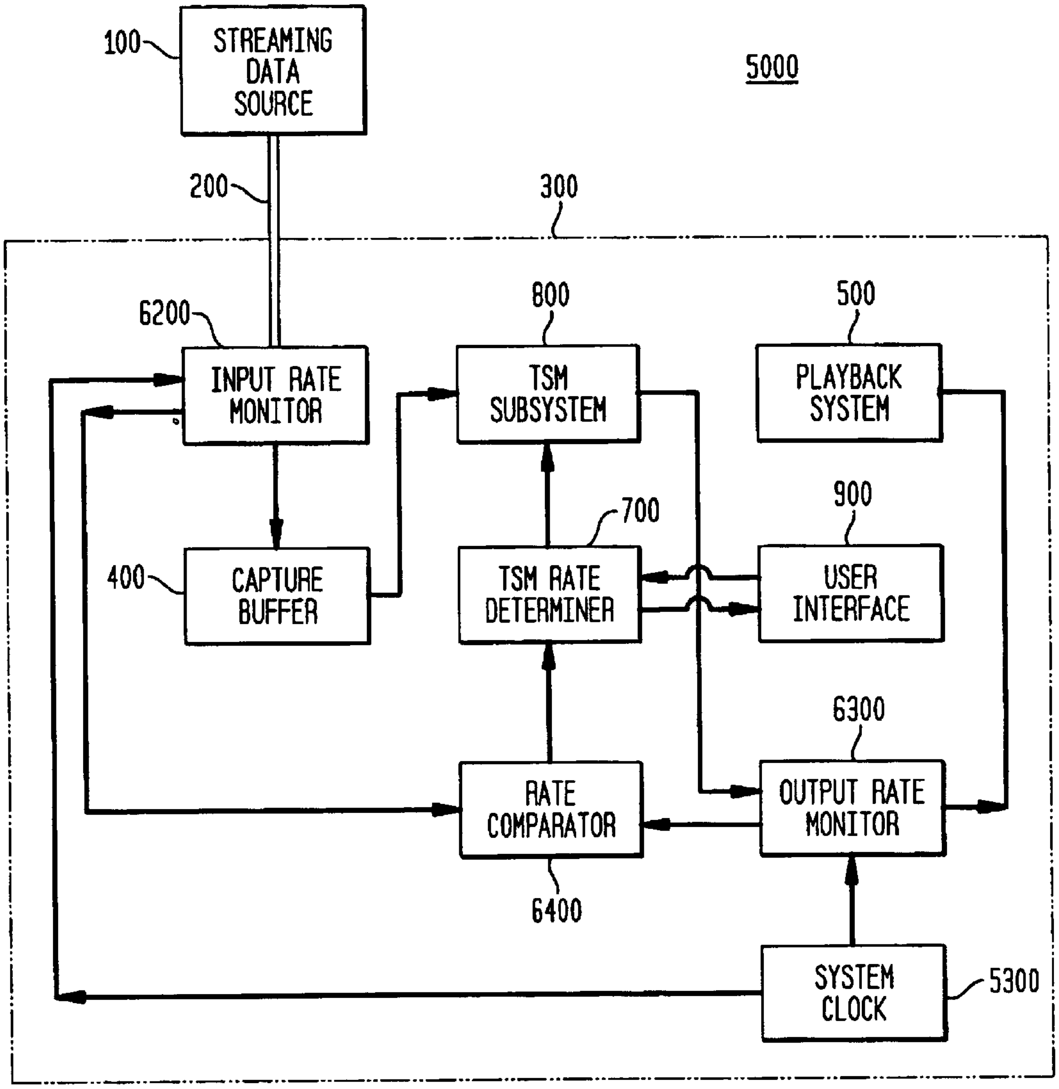

FIG. 9A shows a block diagram of embodiment 5001 of the present invention. As shown in FIG. 9A, embodiment 5001 is obtained from embodiment 5000 shown in FIG. 9 by: (a) having Capture Buffer 400 output data to TSM SubSytem 800; (b) TSM SubSytem 800 output time-scale modified data to ORM 6300; and having ORM 6300 output data to Playback System 500. ORM 6300 produces, as output: (a) media data emptied from TSM SubSystem 800 (this is applied as input to Playback System 500); and (b) information representing a short-term data consumption rate of media data (this is applied as input to RC 6400). ORM 6300 uses any one of many methods that are well known to those of ordinary skill in the art to calculate the short-term data consumption rate. For example, ORM 6300 may monitor the number of data units, buffers, frames, or digital samples, and the like fetched from TSM Subsystem 800 over a small time-interval to determine a short-term data consumption rate. The remainder of embodiment 5001 operates in the manner described for the corresponding portions of embodiment 5000 shown in FIG. 9.

Figure 10:
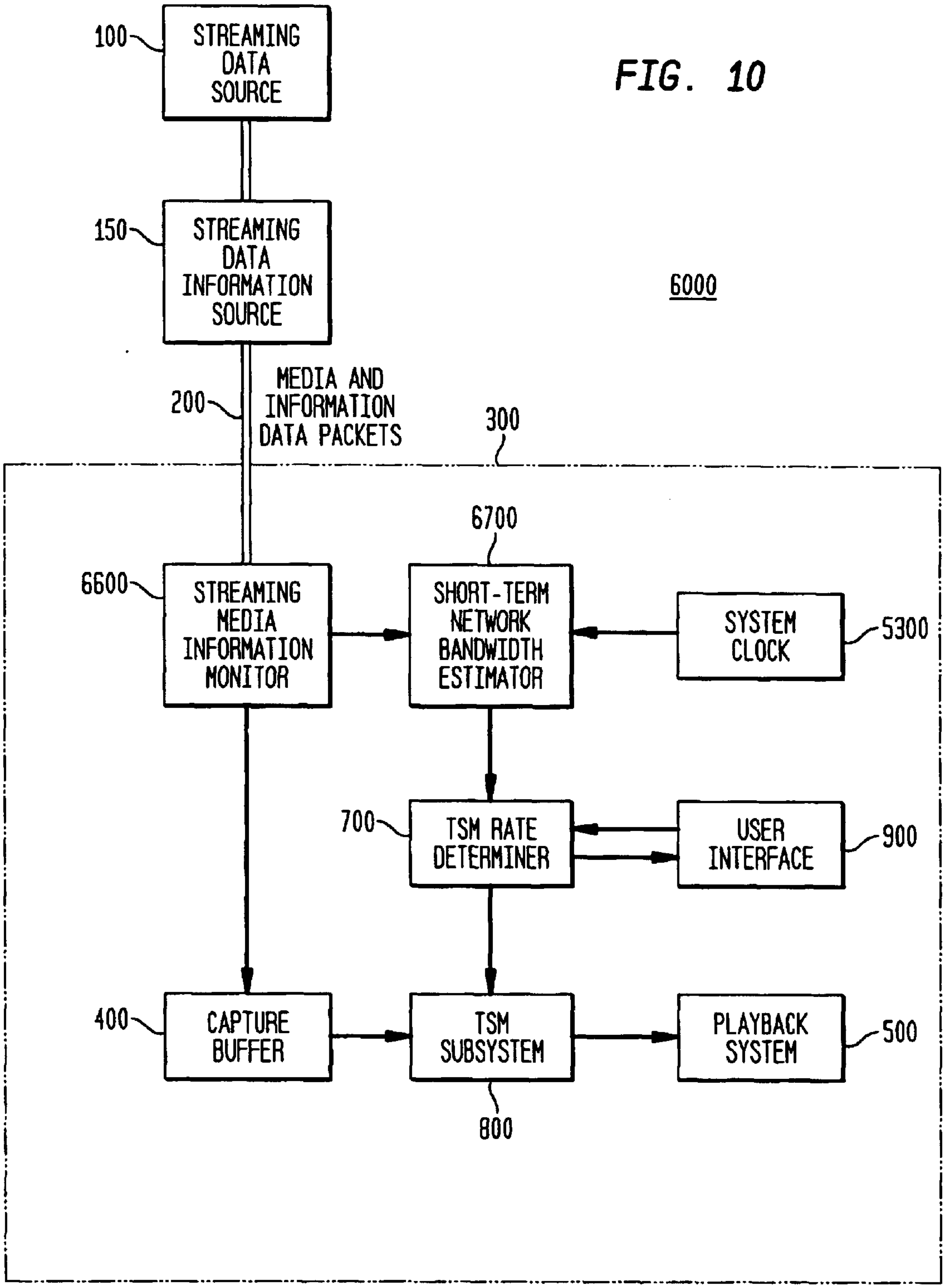

FIG. 10 shows a block diagram of embodiment 6000 of the present invention. As shown in FIG. 10, embodiment 6000 is obtained from embodiment 1000 shown in FIG. 2 by deleting Capture Buffer Monitor 600 and adding: (a) Streaming Data Information Source (SDIS) 150; (b) Streaming Media Information Monitor (SMIM) 6600; (c) Short-Term Network Bandwidth Estimator (STNBE) 6700; and (d) System Clock 5300.

As shown in FIG. 10, SDIS 150 receives, as input, media data packets generated by Streaming Data Source 100. SDIS 150 produces, as output: (a) media data packets (this is applied as input to network 200) and (b) information data packets which describe these media data packets (this is applied as input to network 200). In accordance with the present invention, information contained in the information data packets describes the amount, nature, and timing of media data being transmitted by Streaming Data Source 100. For example, the nature of media data refers to information such as, without limitation, encoding format, number of channels (mono/stereo), bit depth and sampling rate. As a further example, the timing of media data refers to the time that a media data packet was received by SDIS 150 and/or delivered to network 200. The information data packets and the media data packets are transmitted to User System 300 using any one of a number of methods which are well known to those of ordinary skill in the art so that arrival of the information data packets are independent of, and generally more reliable and prompt than, the delivery of the media data packets to Capture Buffer 400. The notion of a delivery method for the information data packets being "more reliable" means delivery over channels and/or using protocols that are more likely to ensure timely and error-free delivery than the channels used to deliver the media data packets. For example, without limitation, using transport protocols or transmission priorities that differ from those used for media data packets. Thus, the information and the data are sent separately. This is referred to below as out-of-band media transmission. In a further embodiment, the information data is appended to the media data packets. This is referred to below as in-band media transmission.

In accordance with the present invention, SDIS 150 may reside on the same physical server as Streaming Data Source 100 (or on a server which is otherwise associated with Streaming Data Source 100), or on an intermediate node in network 200 through which the media data packets pass on their way from Streaming Data Source 100 to User System 300.

As shown in FIG. 10, for the out-of-band case, SMIM 6600 receives, as input: (a) the information data packets generated by SDIS 150 (from network 200) and (b) the media data packets transmitted by SDIS 150 (from network 200). SMIM 6600 produces, as output: (a) the media data packets (this is applied as input to Capture Buffer 400) and (b) the information data packets (this is applied as input to Short-Term Network Bandwidth Estimator (STNBE 6700). For the in-band case, SMIM 6600 separates the media and the information and transfers them as indicated above for the out-of-band case.

As shown in FIG. 10, STNBE 6700 receives, as input, (a) the information data packets and (b) a time clock value from System Clock 5300. STNBE 6700 uses the inputs in accordance with any one of the many methods which are well known to those of ordinary skill in the art to calculate an arrival rate for information over short time intervals, and to estimate the transmission delay variations. This arrival rate provides an effective estimate of the short-term network bandwidth of network 200. The effective short-term network bandwidth is the rate at which packets are arriving over network 200, and is measured, for example, by counting the number of packets received over a period of time like 10 msecs or 300 msecs or 3 seconds and then dividing the number by that time period. Then, STNBE 6700 uses the short-term network bandwidth to generate Playback Control Parameter values and produces, as output, the Playback Control Parameter values (this is applied as input to TSM Rate Determiner 700). Alternative embodiments of SDIM 600 may employ other statistical comparisons of the network transmission characteristics. For example, another statistical measure might be the variance of the transmission rate, which provides a measure of how unreliable the channel is.

In accordance with this embodiment of the present invention, SDIM 600 calculates the Playback Control Parameter values from the short-term network bandwidth using the following formula:

$$\text{Drift Rate}=\text{short-term network bandwidth}/\text{Nominal bandwidth} \quad (12)$$

$$\text{Normalize (Drift Rate)}=-1+(2*\min(\text{Drift Rate}/\text{Unit Drift, Max. Units})/\text{Max. Units}) \quad (13)$$

The remainder of embodiment 6000 operates in the manner described for the corresponding portions of embodiment 1000 shown in FIG. 2.

As shown in FIG. 10, embodiment 1000 optionally comprises User Interface 900 for receiving user generated rate requests in accordance with any one of a number of methods which are well known to those of ordinary skill in the art. The user generated rate requests are applied as input to TSM Rate Determiner 700. These user generated rate requests may be "folded" into the playback rates determined by TSM Rate Determiner 700 to provide continuous playback of streaming media. This means that these requests may be ignored or modified when they would interfere with the objective of providing continuous playback.

Although FIG. 10 shows Capture Buffer 400, Playback System 500, TSM Rate Determiner 700, TSM SubSystem 800, User Interface 900, System Clock 5300, SMIM 6600, and STNBE 6700 of embodiment 6000 as being embodied as separate modules, it will be understood by those of ordinary skill in the art that the functions they perform can be performed by one or more modules in which some or all of the functions are combined. In a preferred embodiment, some or all of the modules are embodied as software programs or modules which run on a general purpose computer such as, for example, a personal computer. Further, in light of the detailed discussion above, it should be well known to one of ordinary skill in the art, to implement these programs or modules in software.

Figure 11:
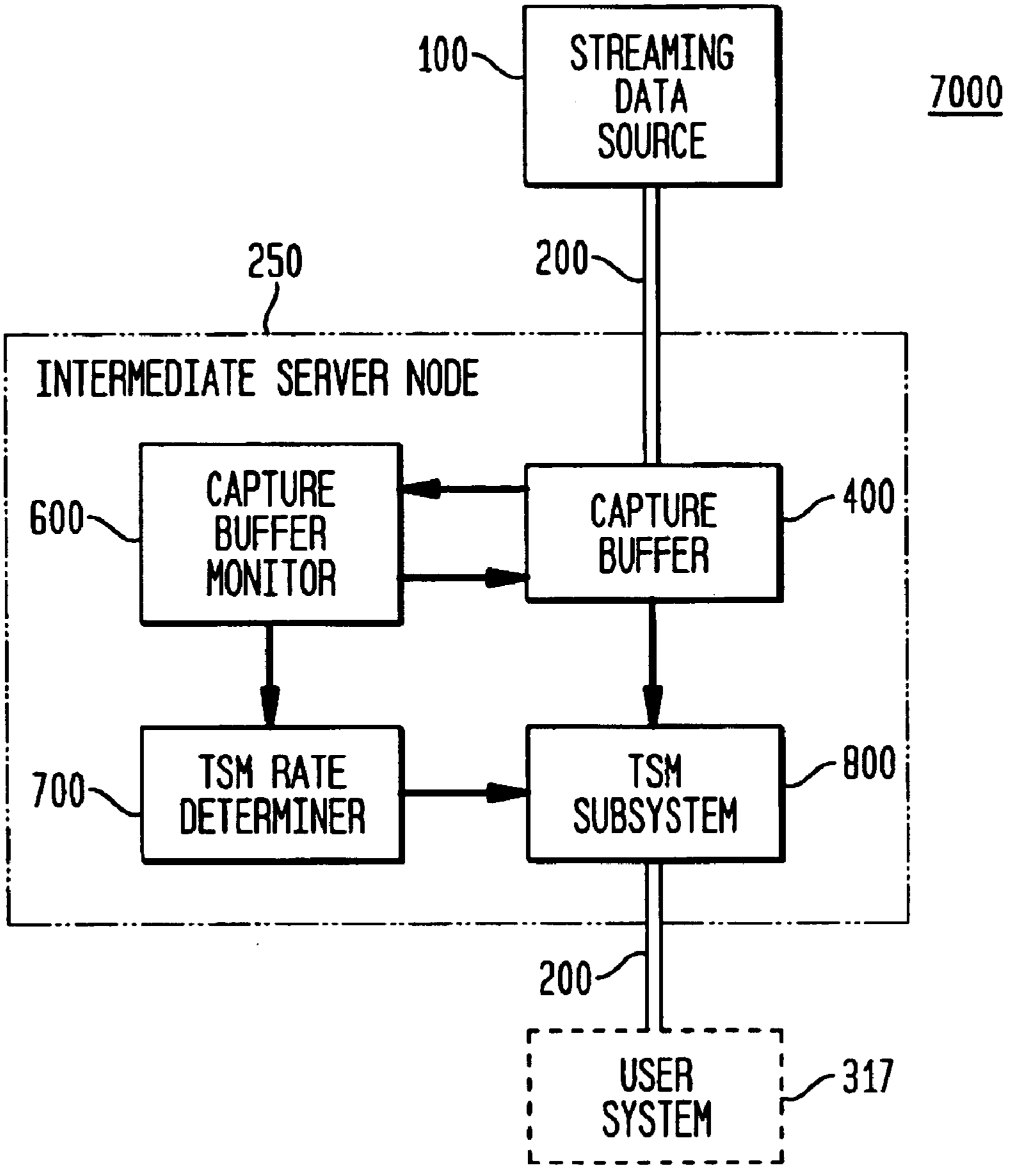

FIG. 11 shows a block diagram of embodiment 7000 of the present invention. As shown in FIG. 11, Intermediate Server Node (ISN) 250 comprises Capture Buffer 400, Capture Buffer Monitor 600, TSM Rate Determiner 700, and TSM SubSystem 800 that operate in the same manner described above for embodiment 1000 shown in FIG. 2. As shown, in FIG. 11, ISN 250 receives media data packets from Stream Data Source 100 over network 200. After processing, in accordance with embodiment 7000 shown in FIG. 11 (instead of forwarding the TSM signal output from TSM SubSystem 800 to Playback System 500 as occurs in embodiment 1000 shown in FIG. 2), or TSM signal output from TSM SubSystem 800, i.e., the media data packets, is forwarded (transmitted) to User System 317 over network 200. It should be understood that if media data packets are encoded forms of a signal, TSM SubSystem 800 may process the encoded format, or decoding may be performed before such data is sent to TSM SubSystem 800. The output of TSM SubSystem 800 may then be re-encoded before being sent to User System 317.

As those of ordinary skill in the art can appreciate from this, ISN 250 acts as an intermediate cache, or store, for the media data packets. In effect, the media data packets are cached in Capture Buffer 400 of FIG. 11. Further, for embodiment 7000, User System 317 acts, in effect, as Playback System 500. Still further, embodiment 7000 may be implemented in such a manner that network 200 is populated with a plurality of caches (for example, as ISN 250 nodes). It should further be understood that ISN 250 shown in FIG. 11 may also be embodied by the analogous portions of embodiments disclosed herein. For example, without limitation, embodiment 3000 shown in FIG. 7 (comprising: Capture Buffer 400, TSM Rate Determiner 700, TSM SubSystem 800, System Clock 5300, DATSS 5400, and DDTSS 5500); embodiment 5000 shown in FIG. 9 (comprising Capture Buffer 400, TSM Rate Determiner 700, TSM SubSystem 800, Input Rate Monitor 6200, Output Rate Monitor 6300, and Rate Comparator 6400); and embodiment 6000 shown in FIG. 10 (comprising Capture Buffer 400, TSM Rate Determiner 700, TSM SubSystem 800, System Clock 5300, SMIM 6600, and STNBE 6700).

Although FIG. 11 shows Capture Buffer 400, Capture Buffer Monitor 600, TSM Rate Determiner 700, and TSM SubSystem 800 of embodiment 7000 as being embodied as separate modules, it will be understood by those of ordinary skill in the art that the functions they perform can be performed by one or more modules in which some or all of the functions are combined. In a preferred embodiment, some or all of the modules are embodied as software programs or modules which run on a general purpose computer such as, for example, a personal computer. Further, in light of the detailed discussion above, it should be well known to one of ordinary skill in the art, to implement these programs or modules in software.

Figure 12:
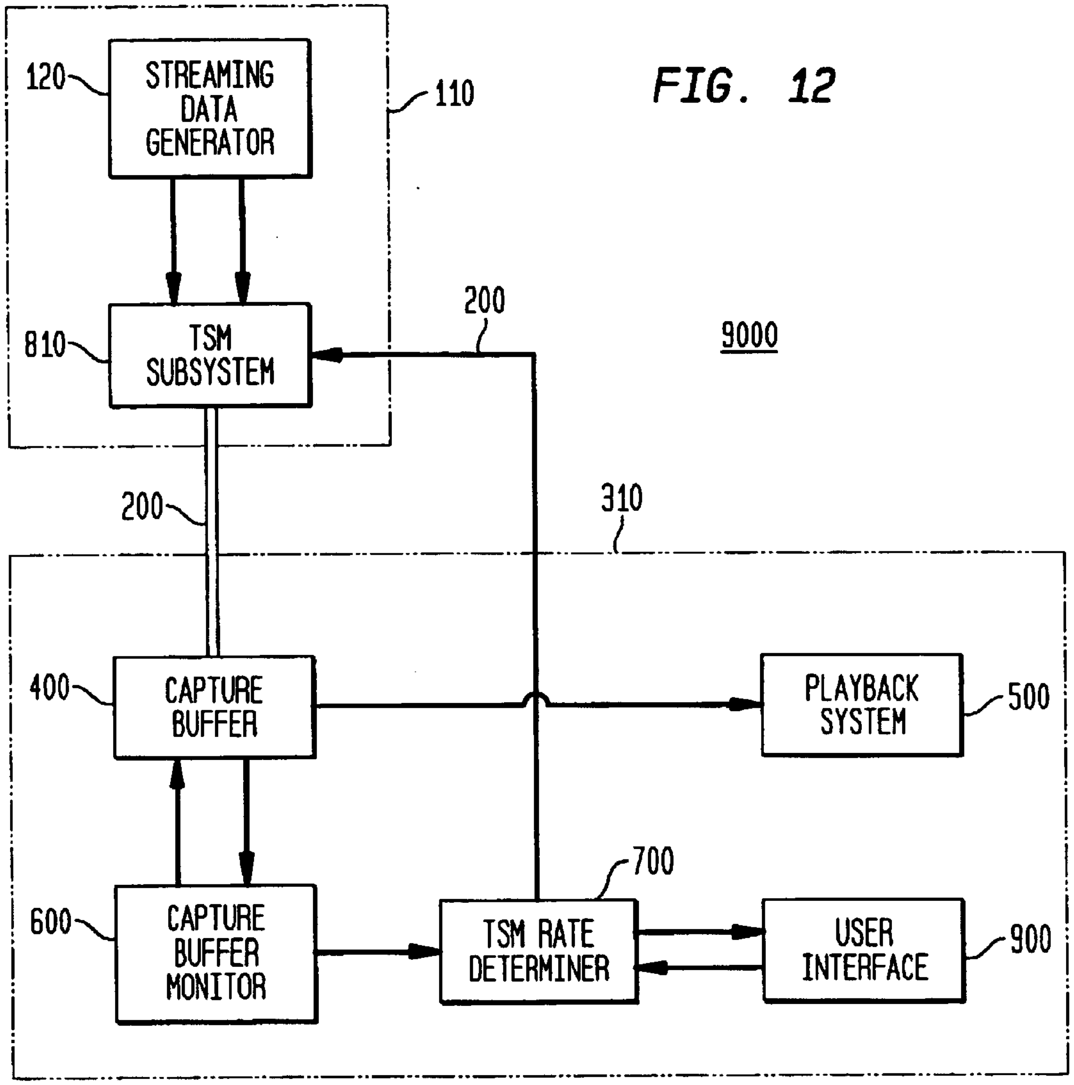

FIG. 12 shows a block diagram of embodiment 9000 of the present invention. As shown in FIG. 12, embodiment

9000 is obtained from embodiment 1000 shown in FIG. 2 by deleting TSM SubSystem 800 from US 300 and replacing Streaming Data Source 100 with Streaming Data Source 110 (Streaming Data Source 110 comprises Streaming Data Generator 120 and TSM SubSystem 810). Streaming Data Generator 120 produces, as output, media data representing an audio or audio-visual work in the form of: (a) a stream of data representing portions of an audio or audio-visual work (this is applied as input to TSM SubSystem 810) and (b) a stream of location information used to identify the position in the stream of data (this is applied as input to TSM SubSystem 810). TSM SubSystem 810 receives, as input: (a) a stream of data representing portions of the audio or audio-visual work (output from Streaming Data Generator 120); (b) a stream of location information (output from Streaming Data Generator 120) used to identify the position in the stream of data being sent, for example, a sample count or time value; and (c) a rate signal specifying a desired TSM rate, or playback rate (output from TSM Rate Determiner 700). In accordance with this embodiment of the present invention, the TSM rate output from TSM Rate Determiner 700 in US 310 is transmitted over network 200, and is applied as input to TSM SubSystem 810. TSM SubSystem 810 modifies the input stream of data in accordance with well known TSM methods to produce, as output, a stream of data that represents a Time-Scale Modified signal, and transmits the data to US 310 over network 200. It should be understood that if the data received by TSM SubSystem 810 is encoded, the data may be processed in encoded format, or may be decoded before processing and then re-encoded after processing. The remainder of embodiment 9000 operates in the same manner described above for embodiment 1000 except that Capture Buffer 400 outputs the data and position directly to Playback System 500.

It should further be understood that US 310 shown in FIG. 12 may also be embodied by the analogous portions of embodiments disclosed herein. For example, without limitation, embodiment 3000 shown in FIG. 7 (comprising: Capture Buffer 400, TSM Rate Determiner 700, System Clock 5300, DATSS 5400, and DDTSS 5500); embodiment 5000 shown in FIG. 9 (comprising Capture Buffer 400, TSM Rate Determiner 700, Input Rate Monitor 6200, Output Rate Monitor 6300, and Rate Comparator 6400); and embodiment 6000 shown in FIG. 10 (comprising Capture Buffer 400, TSM Rate Determiner 700, System Clock 5300, SMIN 6600, and STNBE 6700).

As shown in FIG. 12, embodiment 9000 optionally comprises User Interface 900 for receiving user generated rate requests in accordance with any one of a number of methods which are well known to those of ordinary skill in the art. The user generated rate requests are applied as input to TSM Rate Determiner 700. These user generated rate requests may be "folded" into the playback rates determined by TSM Rate Determiner 700 to provide continuous playback of streaming media. This means that these requests may be ignored or modified when they would interfere with the objective of providing continuous playback.

Although FIG. 12 shows Capture Buffer 400, Playback System 500, Capture Buffer Monitor 600, TSM Rate Determiner 700, and User Interface 900 of User System 310 of embodiment 9000 as being embodied as separate modules, and Streaming Data Generator 120 and TSM SubSystem 810 of Streaming Data Source 110 of embodiment 9000 as being separate modules, it will be understood by those of ordinary skill in the art that the functions they perform can be performed by one or more modules in which some or all of the functions are combined. In a preferred embodiment, some or all of the modules are embodied as software programs or modules which run on a general purpose computer such as, for example, a personal computer. Further, in light of the detailed discussion above, it should be well known to one of ordinary skill in the art, to implement these programs or modules in software.

Figure 13:
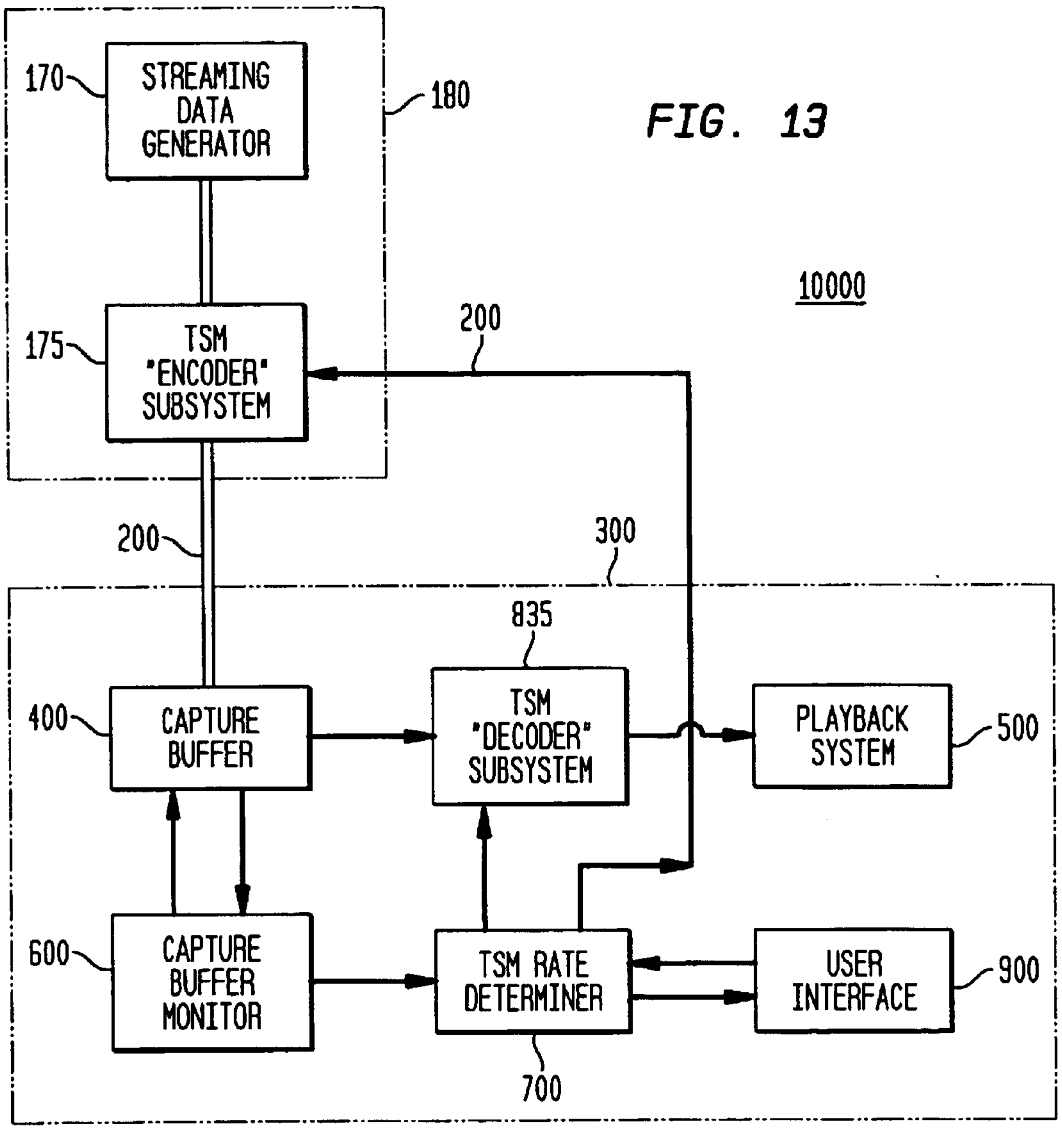

FIG. 13 shows a block diagram of embodiment 10000 of the present invention. As shown in FIG. 13, embodiment 10000 is obtained from embodiment 1000 shown in FIG. 2 by: (a) replacing Streaming Data Source 100 with Streaming Data Source 180 (Streaming Data Source 180 comprises Streaming Data Generator 170 and TSM "Encoder" SubSystem (TES) 175) and (b) replacing TSM SubSystem 800 with TSM "Decoder" SubSystem (TDS) 835.

In accordance with the present invention, Streaming Data Generator 170 produces, as output, media data representing an audio or audio-visual work in the form of: (a) a stream of data representing portions of an audio or audio-visual work (this is applied as input to TES 175) and (b) a stream of location information used to identify the position in the stream of data (this is applied as input to TES 175). TES 175 receives, as input: (a) a stream of data representing portions of the audio or audio-visual work (output from Streaming Data Generator 170); (b) a stream of location information (output from Streaming Data Generator 170) used to identify the position in the stream of data being sent, for example, a sample count or time value; and (c) a rate signal specifying the desired TSM rate, or playback rate (output from TSM Rate Determiner 700). In accordance with this embodiment of the present invention, TSM Rate Determiner 700 in US 300 produces rate information, as output. TSM Rate Determiner 700 transmits: (a) first playback rate information to TES 175 over network 200 and (b) second playback rate information to TDS 835.

In accordance with this embodiment of the present invention, TES 175 modifies the input stream in accordance with well known TSM methods to produce, as output, a stream of data that represents a Time-Scale Modified signal, and transmits the data to US 300 over network 200. Capture Buffer 400 operates in the same manner as in embodiment 1000 in FIG. 2. As a result, TDS 835 receives, as input: (a) a stream of data representing portions of an audio or audio-visual work (from Capture Buffer 400); (b) a stream of location information used to identify the position in the stream of data (from Capture Buffer 400); and (c) rate information (from TSM Rate Determiner 700). TES 175 and TDS 835 differ from TSM SubSystem 800 of embodiment 1000 described above only in the playback rates input thereto from TSM Rate Determiner 700.

In accordance with embodiment 10000 of the present invention, whenever TSM Rate Determiner 700 determines that a faster-than-real-time playback rate is needed to deplete data in Capture Buffer 400 (i.e., rate>1.0), it sends that playback rate to TES 175 and sends a playback rate of 1.0 to TDS 835. Consequently, whenever TSM Rate Determiner 700 determines that a slower-than-real-time playback rate is needed to slow down data depletion in Capture Buffer 400 (i.e., rate<1.0), it sends a playback rate of 1.0 to TES 175, and sends the desired playback rate to TDS 835. Thus, TSM Rate Determiner 700 sends rate information to TES 175 instructing it to speed up playback of a media signal whenever that media signal is to be played faster than its original recording rate. Correspondingly, TSM Rate Determiner 700 sends rate information to TDS 835 instructing it to slow down playback of a media signal whenever that media signal is to be played back slower than its original recording rate. As a result, embodiment 10000 has the advantage of conserving network bandwidth.

More generally, use of a separate playback rate for TES 175 ($R_{TES}$) and a separate playback rate for TDS 835 ($R_{TDS}$) results in an equivalent playback rate given by the following:

$$R_{equiv}=R_{TES}*R_{TDS}. \quad (14)$$

In a preferred embodiment, embodiment 10000 effectively implements a variable-rate data encoding system which utilizes different rates for TES 175 and TDS 835. For example, if the effective short-term bandwidth of network 200 drops, embodiment 10000 can compensate for the reduced bandwidth by setting appropriate values for $R_{TES}$ and $R_{TDS}$. For example, if the effective bandwidth of network 200 drops to 90% of its nominal capacity, embodiment 10000 can compensate for the reduced bandwidth by setting: (a) $R_{TES}$=1.11 and (b) $R_{TDS}$=0.9. This advantageously reduces the effective transmission rate over network 200 to 90% of its nominal value, and results in an overall system playback rate of $R_{equiv}=R_{TES}*R_{TDS}=1.11*0.9\cong 1.0$. The short-term bandwidth of network 200 can be determined using, for example, Input Rate Monitor 6200 described above in junction with the description of embodiment 5000 shown in FIG. 9. In accordance with the present invention, values for $R_{TES}$ and $R_{TDS}$ are chosen algorithmically, typically based on a "rules based" system. For example, a simple rule might be to chose $R_{TES}$ to be the lowest rate that network 200 will support, but not less that 1.0, and to choose $R_{TDS}$ such that eqn. (14) is satisfied.

As shown in FIG. 13, embodiment 10000 optionally comprises User Interface 900 for receiving user generated rate requests in accordance with any one of a number of methods which are well known to those of ordinary skill in the art. The user generated rate requests are applied as input to TSM Rate Determiner 700. These user generated rate requests may be "folded" into the playback rates determined by TSM Rate Determiner 700 to provide continuous playback of streaming media. This means that these requests may be ignored or modified when they would interfere with the objective of providing continuous playback.

Although FIG. 13 shows Capture Buffer 400, Playback System 500, Capture Buffer Monitor 600, TSM Rate Determiner 700, TSM Decoder SubSystem 835, and User Interface 900 of embodiment 10000 as being embodied as separate modules, and Streaming Data Generator 170 and TSM "Encoder" SubSystem 175 of Streaming Data Source 180 of embodiment 10000 as being embodied as separate modules, it will be understood by those of ordinary skill in the art that the functions they perform can be performed by one or more modules in which some or all of the functions are combined. In a preferred embodiment, some or all of the modules are embodied as software programs or modules which run on a general purpose computer such as, for example, a personal computer. Further, in light of the detailed discussion above, it should be well known to one of ordinary skill in the art, to implement these programs or modules in software.

As should be clear to those of ordinary skill in the art, the inventive technique for providing substantially continuous playback may be combined with any number of apparatus which provide time-scale modification and may be combined with or share components with such systems.

Although the cause of delays in providing media content to recipients 2300 have been attributed in the foregoing description to random delays in network 2200 or media broadcast server 2100, the present invention may also be advantageously employed to compensate for delays, either random or deterministic, arising from any other cause, including without limitation attempts by network 2200 or media broadcast server 2100 to limit or regulate the short-term or long-term bandwidth or rate of delivery of data to recipients 2300. Without limitation, one situation in which such attempts to regulate the rate of delivery of data may arise is when recipient 2300 incorporates a User Interface 900, a TSM SubSystem 800, and a TSM Rate Determiner 700, and the user has requested that media data be played back at a rate faster than real time. The alternative embodiment shown in FIG. 13 may be particularly advantageous in such circumstances, in that it is capable of maintaining a data transmission bit-rate which corresponds to real-time playback, even for actual media playback rates that are faster than real-time.

Embodiments of the present invention are advantageous in enabling a single-broadcast system utilizing a broadcast server to provide a single broadcast across one or more non-deterministic delay networks to multiple recipients, for example across the Internet and/or other networks such as Local Area Networks (LANs) and Wide Area Networks (WANs). In such a single-broadcast system, the path to each recipient varies. In fact, the path to each recipient may dynamically change based on loading, congestion and other factors. Therefore, the amount of delay associated with the transmission of each data packet that has been sent by the broadcast server varies. In prior art client-server schemes, each recipient has to notify the broadcast server of its readiness to receive more data, thereby forcing the broadcast server to serve multiple requests to provide a steady stream of data at the recipients' data ports. Advantageously, embodiments of the present invention enable the broadcast server to send out a steady stream of information, and the recipients of the intermittently arriving data to adjust the playback rate of the data to accommodate the non-uniform arrival rates. In addition, in accordance with the present invention, each of the recipients can accommodate the arrival rates independently.

It should be clear to those of ordinary skill in the art, in light of the detailed description set forth above, that in some embodiments of the present invention (a) determine a measure of a mismatch between a data arrival rate and a data consumption rate and (b) utilize time-scale modification to adjust these rates. Various of such embodiments of the invention utilize various methods (a) for determining information which indicates the measure of the mismatch and (b) for determining a playback rate which enables time-scale modification to adjust for the mismatch in a predetermined amount.

In light of this, in another embodiment of the present invention, the playback system determines that there is a data mismatch because it determines a diminution in the arrival of data for playback or subsequent distribution. In response, the playback system sends this information to the TSM Rate Determiner to develop an acceptable playback rate. For example, the playback rate may be reduced by a predetermined amount based on an input parameter or in accordance with any one of a number of algorithms that may be developed by those of ordinary skill in the art.

It should be understood that some embodiments of the present invention described above relate to presentation systems whose playback rates are determined by the media source transmitting data. Specifically, the media source, for example, a server, can elect to send data faster or slower than normal; to cause a faster or slower playback rate provided by these embodiments of User System 300. This mode was referred to above as the "Rate Determined by Data Arrival" mode. It should be understood that the data arrival rate is not the only metric which can be utilized to determine presentation or playback rate. As described above other system metrics, such as CPU availability, may also be used.

The following describes various embodiments of a graphical interface used to fabricate some embodiments of the present invention in conjuction with FIGS. 14–18.

Additionally, some embodiments of the present invention described above relate to presentation systems wherein a determination is made of maximum and minimum presentation rates that are allowable to provide continuous and uninterrupted playback of media existing locally on a storage device or transmitted from a remote storage device via a communication medium. In accordance with these embodiments, the maximum and minimum presentation rates may be used with other information to prevent users of a variable rate presentation system from specifying presentation rates (playback rates) that are outside ranges of rates for continuous and uninterrupted playback. This mode was referred to above as the "Rate Restricted by Data Arrival" mode. It should be understood that the data arrival rate is not the only metric which can be utilized to determine presentation or playback rate. As described above other system metrics, such as CPU availability, may also be used to prevent interruptions in playback.

In one embodiment of the "Rate Restricted by Data Arrival" mode of the present invention, User Interface 900 may comprise a graphical interface which provides a graphical presentation of Current Playback Rate (CPR), Requested Playback Rate (RPR), Current Maximum Sustainable Rate (CmaxSR), Current Minimum Sustainable Rate (CminSR). These are displayed graphically to the user in FIG. 14 as CPR 910, RPR 920, CminSR 930, and CmaxSR 940. It should be understood that the graphical interface described may also be presented to users operating in the "Rate Determined by Data Arrival" mode.

Figure 15:
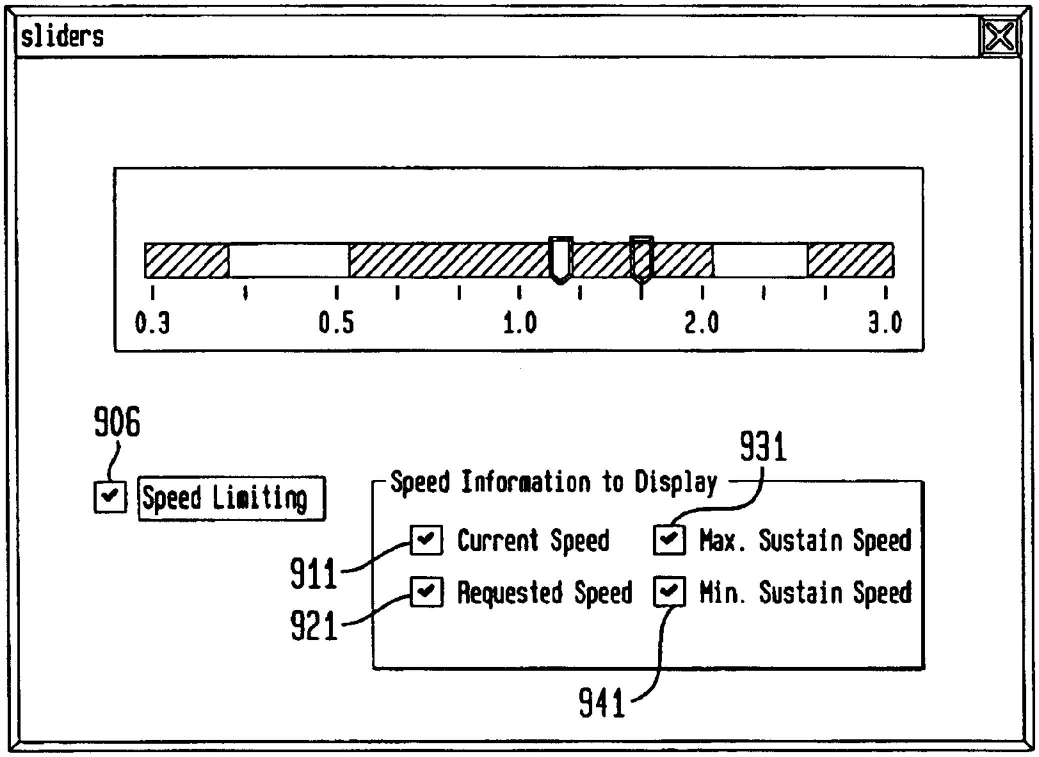

User Interface 900 may also provide various indicators which enable the user to specify: (a) whether a "Rate Restricted by Data Arrival" mode is to be utilized; and (b) whether to display CPR; (c) whether to display RPR; (d) whether to display CmaxSR; and (e) whether to display CminSR. One example of a graphical interface that enables users to make these specifications is shown in FIG. 15. As shown in FIG. 15, Speed Limit™ Enable check-box 906 is used to specify whether a "Rate Restricted by Data Arrival" mode is to be utilized; CPR Display Enable check-box 911 is used to specify whether to display CPR 910; RPR Display Enable check-box 921 is used to specify whether to display RPR 920; CmaxSR Display Enable check-box 931 is used to specify whether to display CmaxSR 930; and CminSR Display Enable check-box 941 is used to specify whether to display CminSR 940. Although FIGS. 15–18 show graphical interfaces wherein the display functionality is set using "check boxes," the present invention is not thusly limited, and any manner of enabling or disabling such features which are well known to those of ordinary skill in the art may be employed.

Advantageously, in accordance with this embodiment, the user can understand the limits of the system because the graphical interface displays CmaxSR which is the fastest playback rate that can be maintained for data obtained from a given source (whether the source is local or remote); and CminSR which is the slowest playback rate that can be maintained, for data obtained from a given source (whether the source is local or remote). CmaxSR and CminSR may vary with time, and, as a result, they provide a dynamic metric which indicates presentation or playback rates that can be used at any particular time without draining or overflowing Capture Buffer 400 of input data in the various embodiments set forth in detail above.

Further, in accordance with this embodiment, the graphical interface indicates the most recently user-requested presentation rate, RPR 920, and the current presentation rate, CPR 910. In a preferred embodiment, RPR 920 and CPR 910 are both indicated by a location on a single slider. When the user can see distinguishable indications of CPR 910 and RPR 920 on the single slider, CPR 910 and RPR 920 are not equal. As was described in detail above, in accordance with this embodiment, the current playback speed (CPR 910) will transition to the requested playback rate (RPR 920) over a time interval unless RPR is outside a range defined by CminSR to CmaxSR.

Figure 14:
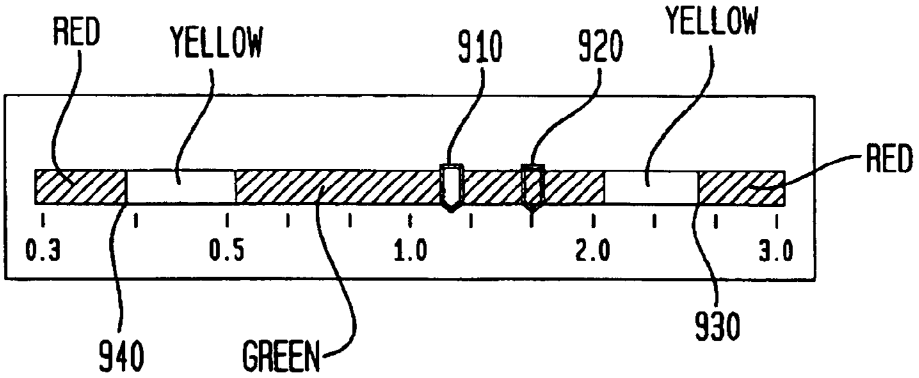
FIGS. 14–18 show displays produced by various embodiments of a graphical interface used to fabricate at least some embodiments of the present invention.

In accordance with this embodiment of the graphical interface, CPR 910 and RPR 920 are differentiated from one another by using different icons, or identical icons with different transparency, or color intensity, for example, see FIG. 14. Although the graphical interface could use a cursor or a position indicator on a slider to indicate CPR 910 and RPR 920, the present invention is not thusly limited, and any number of methods that are well known to those of ordinary skill in the art may be used to provide a graphical interface to display and distinguish CPR and RPR. For example, and without limitation, the values of CPR 910 and RPR 920 may be indicated by numbers or an indication, for example, in the form of an icon, that appears on an axis.

In accordance with some embodiments of the "Rate Restricted by Data Arrival" mode (this mode will be utilized whenever SpeedLimit Enable check-box 906 is checked, see the displays produced by various embodiments shown in FIGS. 15–18), the user requests a new playback, or presentation, rate by moving RPR to a new value using, for example, a mouse positioned over RPR 920 on the slider shown, for example, in the displays produced by various embodiments shown in FIGS. 14–18. In accordance with one embodiment, the user receives feedback regarding the request via a change, for example, in appearance and/or location, of RPR 920. Next, as the system responds to the user's request, the graphical interface will update the display so that as CPR moves toward RPR, CPR 910 moves toward RPR 920 until both CPR 910 and RPR 920 are at substantially the same value, if this is possible. This display will be seen, providing CPR Display Enable check-box 911 and RPR Display Enable check-box 921 are checked, see the displays produced by various embodiments shown in FIGS. 15 and 17–18. In accordance with this embodiment, whenever the user requests a playback rate that is higher than CmaxSR 930: (a) the graphical interface will place RPR 920 at the user-requested rate on the slider, and (b) the graphical interface will indicate changes in CPR by moving CPR 910 as the values of CPR change. Of course, in accordance with this embodiment, CPR 910 will remain within bounds set by the value of CmaxSR 930. If, however, the value of CmaxSR 930 changes, either higher or lower, then CPR 910 will adjust accordingly so that it remains just slightly below the value of CmaxSR 930, but does not exceed CmaxSR 930 or RPR 920. As one can readily appreciate, this causes the presentation system to perform the maximum playback rate increase allowable without draining Capture Buffer 400, and to respond to the user's request with rate changes that prevent underflow in Capture Buffer 400. Similarly, if the user requests a playback rate that is slower than CminSR 940: (a) the graphical interface will place RPR 920 at the user-requested rate on the slider, and (b) the graphical interface will indicate changes in CPR by moving CPR 910 as the values of CPR change. Of course in accordance with this embodiment, CPR 910 will remain within bounds set by the value of CminSR 940. If, however, the value of CminSR 940 changes, either higher or lower, then CPR 910 will adjust accordingly so that it remains just slightly above the value of CminSR 940, but does not fall below CminSR 940 or RPR 920.

As shown in FIG. 14, the graphical interface displays CmaxSR 930 and CminSR 940 as a boundary between colored regions within the range of the slider. In particular, as shown in FIG. 14, the boundaries between the red and yellow regions and the yellow and red regions, respectively, indicate values of CminSR 940 and CmaxSR 930, respectively. As further shown in FIG. 14, CPR 910 is displayed using a solid "sliding indicator" while RPR 920 is displayed using a hollow "sliding indicator". It should be understood that the inventive graphical interface is not limited to this particular choice for displaying the values of CPR, RPR, CminSR, and CmaxSR, and that any one of a number of display choices are considered to be within the scope of the present invention, for example, and without limitation, using a solid "sliding indicator" for RPR and a hollow "sliding indicator" for CPR. Other examples include using a "diamond" or other icon to display CPR and a solid "sliding indicator" to display RPR. In another example, shown in FIG. 18 (produced by an alternative embodiment), RPR is displayed using a solid "sliding indicator" and a colored line that fills in the "slider track" from the left side to the value of CPR 910 (in the same manner that the mercury of a thermometer indicates temperature) is used to display CPR 910. In another example, shown in FIG. 14, a green line is used to display playback rates that can be sustained without draining or overflowing Capture Buffer 400, a yellow line is used to display playback rates that may not be able to be thusly sustained under all circumstances, and a red line is used to display playback rates that will cause underflow or overflow conditions in Capture Buffer 400. Although FIG. 14 shows a graphical display using three colors to display boundaries within CmaxSR 930 and CminSR 940, it should be understood that this does not limit the present invention and that many other implementations can be made that are within the scope of the present invention, for example, implementations using only two colors to display the above-described information. Further, the choice of colors or shadings used to display the information may be varied according to design style. In another example, shown in FIG. 17 (produced by an alternative embodiment), CPR is displayed using a "thermometer-like" display and RPR is displayed using an indicator on a slider.

Figure 16:
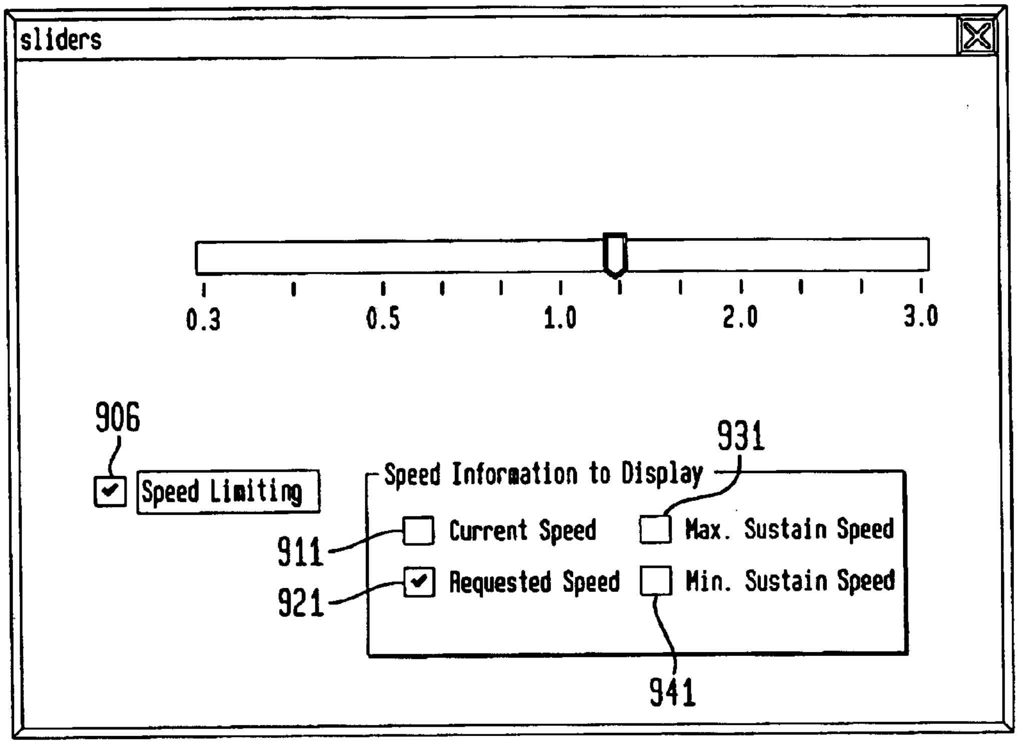
Figure 17:
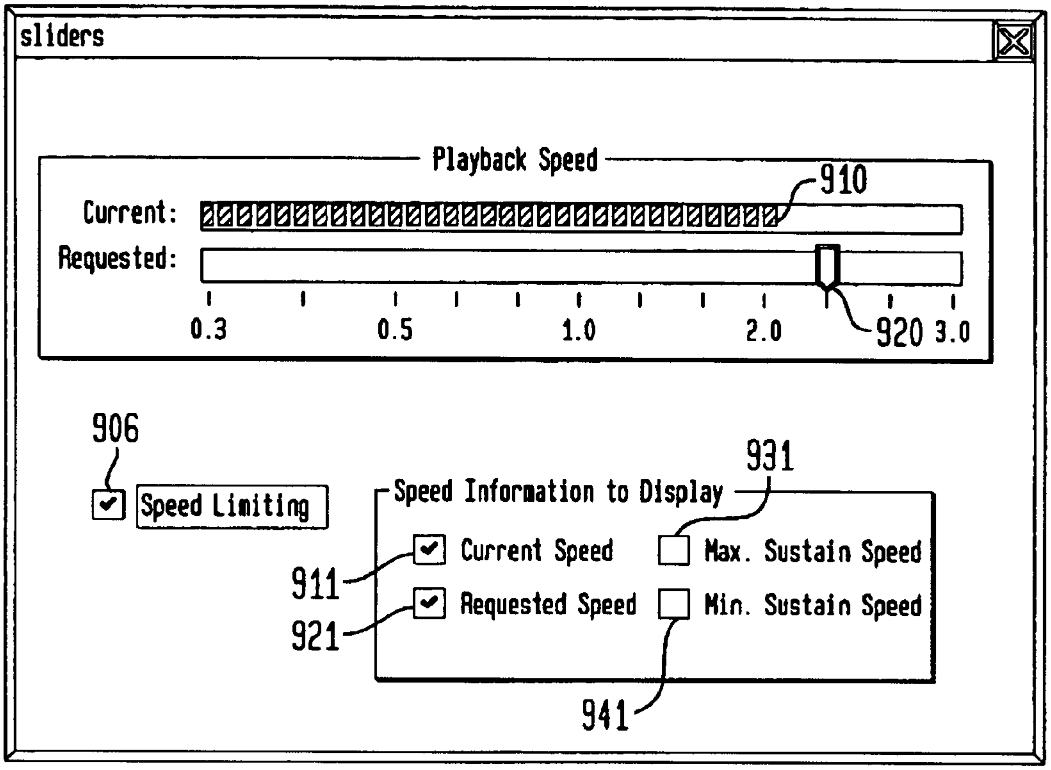
Figure 18:
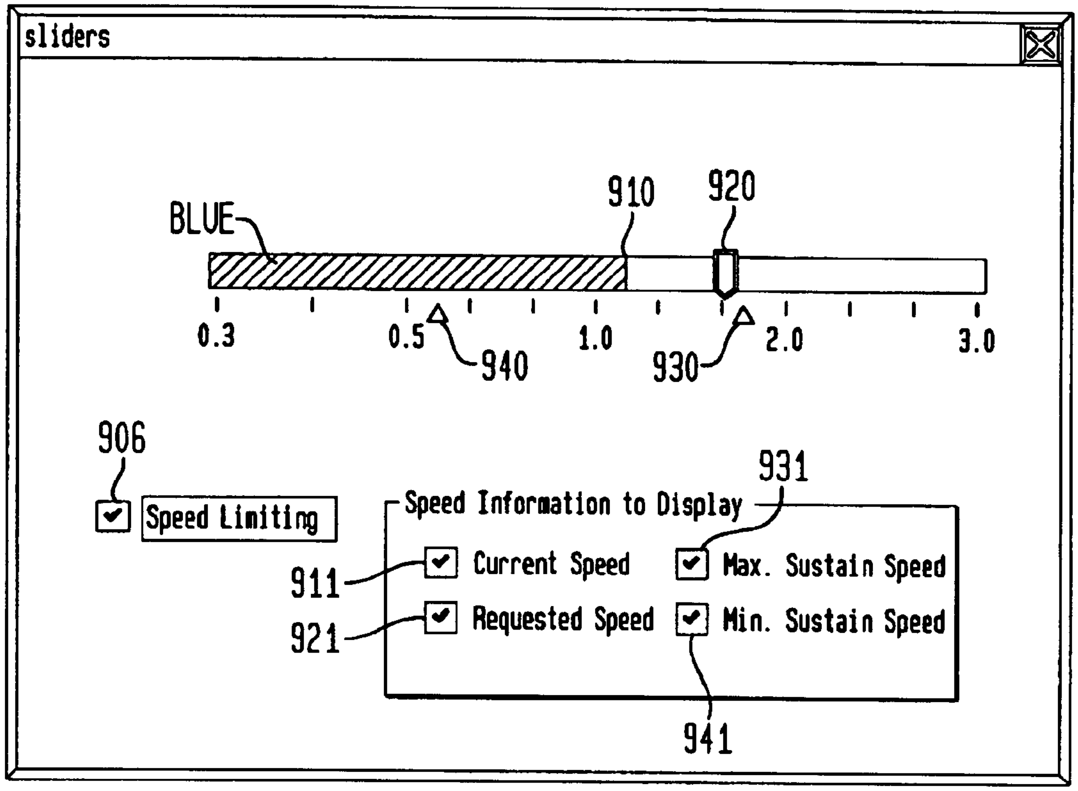

As shown in the displays of FIGS. 15–18, the "Rate Restricted by Data Arrival" mode will be utilized since SpeedLimit™ Enable check-box 906 is checked. Further, FIGS. 15 and 18 show displays which indicate that a user has requested that all information be displayed by having checked all check-boxes to the "on" position. Still further, FIG. 16 shows a display which indicates that the user has opted not to display CPR, CmaxSR, and CminSR. Yet still further, FIG. 17 shows a display which indicates that the user has opted not to display CmaxSR and CminSR.

Lastly, one can use any one of a number of methods that are well known to those of ordinary skill in art to create the graphical interface displays described above and shown in FIGS. 14–18. In addition it should be understood that variations in orientation of the sliders and indicators discussed above are considered to be within the scope of the present invention, for example, vertically oriented sliders and indicators may be used. Furthermore, it should be understood that although a graphical interface has been described above, alternative interfaces may be used, such as, an interface comprised of keypresses that map to specific requests for a playback rate and audio tones, or spoken numbers to indicate values. For example, the keys "s" and "f" may be used to request slower and faster playback rates respectively, and in response to these keys being pressed the system may employ text to speech or pre-recorded utterances to announce the values of RPR, CPR, CmaxSR, and CminSR. There are numerous methods well known to those of ordinary skill in the art for combining the playback of utterances, text-to-speech systems, and keyboard only interfaces to software programs.

Those skilled in the art will recognize that the foregoing description has been presented for the sake of illustration and description only. As such, it is not intended to be exhaustive or to limit the invention to the precise form disclosed.

For example, those of ordinary skill in the art should readily understand that whenever the term "Internet" is used, the present invention also includes use with any non-deterministic delay network. As such, embodiments of the present invention include and relate to the world wide web, the Internet, intranets, local area networks ("LANs"), wide area networks ("WANs"), combinations of these transmission media, equivalents of these transmission media, and so forth.

In addition, it should be clear that embodiments of the present invention may be included as parts of search engines used to access streaming media such as, for example, audio or audio-visual works over the Internet.

In further addition, it should be understood that although embodiments of the present invention were described wherein the audio or audio-visual works were applied as input to playback systems, the present invention is not limited to the use of a playback system. It is within the spirit of the present invention that embodiments of the present invention include embodiments wherein the playback system is replaced by a distribution system, which distribution system is any device that can receive digital audio or audio-visual works and re-distribute them to one or more other systems that replay or re-distribute audio or audio-visual works. In such embodiments, the playback system is replaced by any one of a number of distribution applications and systems which are well known to those of ordinary skill in the art that further distribute the audio or audio-visual work. It should be understood that the devices that ultimately receive the re-distributed data can be "dumb" devices that lack the ability to perform Time-Scale modification or "smart" devices that can perform Time-Scale modification.

Although embodiments of the present invention have been described using data input from a streaming media source, the present invention is not limited to such embodiments. In particular, embodiments of the present invention may be used for data arriving from any source, local or remote, streamed or delivered in bulk. Further it should be understood that embodiments of the present invention relate to management of the flow of data from any source.

Although embodiments of the present invention have been described as relating to presentation or playback systems, the present invention is not limited to such embodiments. In particular, embodiments of the present invention relate to methods and apparatus for preparing media or data representing audio and audio/visual media for presentation or playback.

What is claimed is:

1. A client apparatus for preparing streaming media received over a non-deterministic delay network for playback or distribution which comprises:

a buffer which stores data corresponding to the streaming media;

a time-scale modification system that time-scale modifies data output from the buffer at a time-scale modification playback rate; and a rate determiner that determines the time-scale modification playback rate over an interval to control an amount of data in the buffer;

wherein the rate determiner determines the time-scale modification playback rate as a non-linear function of the amount of data;

wherein $T_L$ is a low threshold value and $T_H$ is a high threshold value of data in the buffer; and For $0<=X<=T_L$; time-scale modification playback rate=Scale*$\tanh^{-1}$ ((X−$T_L$/ $T_L$)

For $T_L<X<T_H$; time-scale modification playback rate=a predetennined time-scale modification playback rate For $T_H<=X<=$Max; time-scale modification playback rate=Scale*$\tanh^{-1}$ ((X−$T_H$)/(Max−$T_H$));

where X is the amount of data in the buffer, Max is the maximum amount of data that can be stored in the buffer, and Scale is arbitrary scale factor.

2. The client apparatus of claim 1 wherein the non-linear function depends on predetermined threshold parameters.

* * * * *